US012626875B2

(12) United States Patent
Zhong et al.

(10) Patent No.: US 12,626,875 B2
(45) Date of Patent: May 12, 2026

(54) RELAY

(71) Applicant: Xiamen Hongfa Electric Power Controls Co., Ltd., Xiamen (CN)

(72) Inventors: Shuming Zhong, Xiamen (CN); Meng Wang, Xiamen (CN); Wenguang Dai, Xiamen (CN); Songsheng Chen, Xiamen (CN)

(73) Assignee: XIAMEN HONGFA ELECTRIC POWER CONTROLS CO., LTD., Xiamen (CN)

( * ) Notice: Subject to any disclaimer, the term of this patent is extended or adjusted under 35 U.S.C. 154(b) by 246 days.

(21) Appl. No.: 18/632,245

(22) Filed: Apr. 10, 2024

(65) Prior Publication Data

US 2024/0347299 A1 Oct. 17, 2024

(30) Foreign Application Priority Data

Apr. 11, 2023 (CN) ......................... 202310383300.1

(51) Int. Cl.
*H01H 50/02* (2006.01)
*H01H 50/18* (2006.01)
(Continued)

(52) U.S. Cl.
CPC ............ *H01H 50/02* (2013.01); *H01H 50/18* (2013.01); *H01H 50/36* (2013.01); *H01H 50/60* (2013.01)

(58) Field of Classification Search
CPC ........ H01H 50/18; H01H 50/02; H01H 50/36; H01H 50/60; H01H 1/54; H01H 50/546;
(Continued)

(56) References Cited

U.S. PATENT DOCUMENTS 3,887,888 A 6/1975 Bayles et al.
3,991,290 A 11/1976 Bayles et al.
(Continued)

FOREIGN PATENT DOCUMENTS

CN 103238198 A 8/2013
CN 104810205 A 7/2015
(Continued)

OTHER PUBLICATIONS

Office Action from related corresponding Chinese Patent Application No. 202211249316.5, dated Aug. 27, 2025.
(Continued)

*Primary Examiner* — Mohamad A Musleh
(74) *Attorney, Agent, or Firm* — Perkins Coie LLP

(57) ABSTRACT

A relay includes an insulating cover having a contact chamber and a pair of first through holes in communication with the contact chamber; a pair of static contact leading-out terminals passing through the pair of first through holes; a fixing member including a fixing part and a connector with a tubular structure, the connector is fixedly connected between the insulating cover and the fixing part; a moving part within the contact chamber and movably connected to the fixing member; a first magnetizer within the contact chamber and connected with the moving part; and a movable member within the contact chamber and including a movable contact piece. The first magnetizer is movable relative to the movable member through the moving part and is configured to adjust a distance between the first magnetizer and the movable member according to a value of a current flowing through the movable contact piece.

22 Claims, 16 Drawing Sheets

(51) Int. Cl.
*H01H 50/36* (2006.01)
*H01H 50/60* (2006.01)

(58) Field of Classification Search
CPC ........ H01H 9/30; H01H 50/026; H01H 50/64; H01H 50/38; H01H 50/54
See application file for complete search history.

(56) References Cited

U.S. PATENT DOCUMENTS

| | | | | |
|---|---|---|---|---|
| 4,513,270 | A | 4/1985 | Belbel et al. | |
| 4,933,654 | A | 6/1990 | Hori et al. | |
| 2014/0002215 | A1 | 1/2014 | Ionescu et al. | |
| 2022/0122792 | A1 | 4/2022 | Zhou | |
| 2023/0335360 | A1 | 10/2023 | Dai et al. | |
| 2024/0312744 | A1 | 9/2024 | Dai et al. | |

FOREIGN PATENT DOCUMENTS

| | | | | |
|---|---|---|---|---|
| CN | 106486324 | A | 3/2017 | |
| CN | 206819939 | U | 12/2017 | |
| CN | 109659199 | A | 4/2019 | |
| CN | 110164737 | A | 8/2019 | |
| CN | 110349811 | A | 10/2019 | |
| CN | 210142625 | U | 3/2020 | |
| CN | 111091987 | A | 5/2020 | |
| CN | 211320483 | U | 8/2020 | |
| CN | 111627758 | A | 9/2020 | |
| CN | 211575481 | U | 9/2020 | |
| CN | 211980527 | U | 11/2020 | |
| CN | 212032959 | U | 11/2020 | |
| CN | 212182232 | U | 12/2020 | |
| CN | 112542355 | A | 3/2021 | |
| CN | 212786153 | U | 3/2021 | |
| CN | 112750663 | A | 5/2021 | |
| CN | 112967906 | A | 6/2021 | |
| CN | 214542039 | U | 10/2021 | |
| CN | 113782392 | A | 12/2021 | |
| CN | 215451293 | U | 1/2022 | |
| CN | 216122877 | U | 3/2022 | |
| CN | 216528650 | U | 5/2022 | |
| CN | 217158052 | U | 8/2022 | |
| CN | 218299710 | U | 1/2023 | |
| CN | 218385011 | U | 1/2023 | |
| CN | 218385017 | U | 1/2023 | |
| CN | 218385018 | U | 1/2023 | |
| CN | 218385019 | U | 1/2023 | |
| CN | 218385020 | U | 1/2023 | |
| CN | 218385036 | U | 1/2023 | |
| CN | 218385037 | U * | 1/2023 | ........... H01H 50/546 |
| CN | 218385041 | U | 1/2023 | |
| CN | 218385042 | U | 1/2023 | |
| CN | 218385043 | U | 1/2023 | |
| CN | 218548326 | U | 2/2023 | |
| CN | 218631843 | U | 3/2023 | |
| CN | 218730704 | U | 3/2023 | |
| CN | 218996617 | U | 5/2023 | |
| CN | 117877930 | A | 4/2024 | |
| CN | 117912891 | A | 4/2024 | |
| CN | 117912892 | A | 4/2024 | |
| CN | 117912893 | A | 4/2024 | |
| CN | 117912896 | A | 4/2024 | |
| CN | 117912897 | A | 4/2024 | |
| CN | 117912898 | A | 4/2024 | |
| CN | 117912899 | A | 4/2024 | |
| CN | 117912900 | A | 4/2024 | |
| JP | 2011204479 | A | 10/2011 | |
| JP | 2012022982 | A | 2/2012 | |
| JP | 2012038683 | A | 2/2012 | |
| JP | 2012104362 | A | 5/2012 | |
| JP | 2012199122 | A | 10/2012 | |
| JP | 2013175436 | A | 9/2013 | |
| JP | 2015079672 | A | 4/2015 | |
| JP | 2019192545 | A | 10/2019 | |
| JP | 2022139817 | A | 9/2022 | |
| WO | 2024078418 | A1 | 4/2024 | |
| WO | 2024078421 | A1 | 4/2024 | |
| WO | 2024078423 | A1 | 4/2024 | |
| WO | 2024078424 | A1 | 4/2024 | |
| WO | 2024078455 | A1 | 4/2024 | |
| WO | 2024078461 | A1 | 4/2024 | |
| WO | 2024078537 | A1 | 4/2024 | |
| WO | 2024078539 | A1 | 4/2024 | |
| WO | 2024078542 | A1 | 4/2024 | |
| WO | 2024078543 | A1 | 4/2024 | |

OTHER PUBLICATIONS

Decision to Grant a Patent from related corresponding Japanese Patent Application No. 2024-063062, dated Sep. 30, 2025.
Decision to Grant a Patent from related corresponding Japanese Patent Application No. 2024-063288, dated Oct. 28, 2025.
Japan Notice of Allowance Mailed Apr. 22, 2025 In App. 2024-063140,.
“”International Application No. PCT/CN2023/123399 Search Report mailed Jan. 2, 2024, pp. 1-34.
“”International Application No. PCT/CN2023/123423, Search Report Mailed Dec. 29, 2023, pp. 1-37.
“”International Application No. PCT/CN2023/123428, Search Report Mailed Dec. 29, 2023, pp. 1-37.
“”International Application No. PCT/CN2023/123595, Search Report Mailed Dec. 29, 2023, pp. 1-37.
“”International Application No. PCT/CN2023/123604, Search Report mailed Dec. 29, 2023, pp. 1-69.
“”International Application No. PCT/CN2023/124040, Search Report Mailed Dec. 29, 2024, pp. 1-33.
“”International Application No. PCT/CN2023/124040, Search Report Mailed Jan. 3, 2024, pp. 1-33.
“”International Application No. PCT/CN2023/124044, Search Report mailed Dec. 11, 2023, pp. 1-21.
“”International Application No. PCT/CN2023/124058, Search Report Mailed Jan. 3, 2024, pp. 1-34.
“”International Application No. PCT/CN2023/124059, Search Report Mailed Jan. 3, 2024, pp. 1-46.
International Application No. PCT/CN2023/123432, Search Report Mailed Dec. 29, 2024, pp. 1-33.
International Application No. PCT/CN2023/124058, Search Report Mailed Dec. 21, 2023, pp. 1-34.
Office Action from corresponding related U.S. Appl. No. 18/632,252, dated Jan. 7, 2026.
Notice of Allowance from corresponding related U.S. Appl. No. 18/632,271, dated Feb. 9, 2026.

* cited by examiner

RELAY

CROSS-REFERENCE TO RELATED APPLICATION(S)

This application is based upon and claims priority to Chinese Patent Application No. 202310383300.1, filed on Apr. 11, 2023, the entire content thereof is incorporated herein by reference.

TECHNICAL FIELD

An embodiment of the present disclosure relates to the technical field of electronic control devices, in particular to a relay.

BACKGROUND

A relay is an electronic control device that has a control system (also called an input circuit) and a controlled system (also called an output circuit), and usually used in an automatic control unit. The relay is actually an automatic switch that may control a larger current with a smaller current, so that it plays a role of automatic adjustment, safety protection and switching circuits in the circuit.

A high-voltage DC relay is a kind of relay. In order to solve the issue of contact bounce caused by the electrodynamic repulsion force of contacts in the high-voltage DC relay due to short circuit current, it is common to employ an anti-short circuit ring electromagnetic structure. Based on a position of the upper magnetizer of the anti-short circuit ring, it could be further classified into a follow-up structure and a stationary structure. Specifically, the follow-up structure refers to that the upper magnetizer is placed on a movable member of the relay, while the stationary structure refers to that the upper magnetizer is arranged in a fixed location other than the movable member. However, although the stationary anti-short circuit structure significantly enhances its ability to withstand the short circuit, it results in that breaking ability is weaken due to the negative correlation between the short circuit ability and the breaking ability. The movable anti-short circuit structure is affected by a holding force of a movable core, and when the short circuit current is high, the magnetic core may be detached, resulting in contact broken. To increase the holding force of the movable core, it requires increasing size of the coil, which is conflict with a compact and lightweight design.

SUMMARY

A relay according to the embodiment of the present disclosure includes:

- an insulating cover having a contact chamber and a pair of first through holes in communication with the contact chamber;
- a pair of static contact leading-out terminals passing through the pair of first through holes, respectively;
- a fixing member comprising a fixing part and a connector, the connector has a tubular structure, one end of the connector in an axial direction is fixedly connected with the insulating cover, and the other end of the connector in the axial direction is connected with the fixing part;
- a moving part arranged within the contact chamber and movably connected to the fixing member;
- a first magnetizer arranged within the contact chamber and connected with the moving part; and
- a movable member movably arranged within the contact chamber and comprising a movable contact piece, the movable contact piece configured to come into contacted with or separated from the pair of static contact leading-out terminals; the first magnetizer being arranged at one side of the movable contact piece facing the static contact leading-out terminals;
- wherein the first magnetizer is movable relative to the movable member through the moving part and is configured to adjust a distance between the first magnetizer and the movable member according to a value of a current flowing through the movable contact piece.

According to some embodiments of the present disclosure, the distance between the first magnetizer and the movable member is a maximum distance between the first magnetizer and the movable member.

According to some embodiments of the present disclosure, the first magnetizer moves between a first position and a second position through the moving part;

- at the first position, the distance between the first magnetizer and the movable member is a first distance, and at the second position, the distance between the first magnetizer and the movable member is a second distance, and the first distance is greater than the second distance.

According to some embodiments of the present disclosure, at the second position, the second distance between the first magnetizer and the movable member is equal to zero.

According to some embodiments of the present disclosure, the first magnetizer is located at the first position, and the value of the current flowing through the movable contact piece is less than or equal to a threshold current;

- when the value of the current flowing through the movable contact piece is greater than the threshold current, the first magnetizer moves from the first position to the second position.

According to some embodiments of the present disclosure, the relay further comprises:

- a first elastic part for providing an elastic force to the moving part, so that the first magnetizer has a trend to move away from the movable member.

According to some embodiments of the present disclosure, the fixing part has a first side facing the movable member and a second side opposite to the first side;

- the first elastic part is arranged at the second side, the first magnetizer and the movable member are both arranged at the first side, and the first magnetizer is arranged between the first elastic part and the movable member;
- the moving part has one end connected with the first elastic part, and the other end connected with the first magnetizer.

According to some embodiments of the present disclosure, the fixing part has a first perforation which penetrates a surface of the first side and a surface of the second side;

- the moving part is rod-shaped and movably passes through the first perforation.

According to some embodiments of the present disclosure, the first elastic part has a second perforation aligning with the first perforation;

- the moving part passes through the first perforation and the second perforation.

According to some embodiments of the present disclosure, the moving part comprises a rod body and a pressing cap arranged at an end of the rod body, and the pressing cap presses against a periphery of the second perforation facing away from a side of the first magnetizer.

According to some embodiments of the present disclosure, the first magnetizer is provided with a third perforation aligning with the first perforation and the second perforation, and the rod body passes through the second perforation, the first perforation and the third perforation in sequence;

a step structure is arranged at an outer periphery of the rod body, an end of the rod body facing the movable member is fixedly connected with the first magnetizer, and the step structure presses against a periphery of the third perforation facing a side of the first elastic part.

According to some embodiments of the present disclosure, the first magnetizer moves between a first position and a second position through the moving part; at the first position, a distance between the first magnetizer and the movable member is a first distance, and at the second position, a distance between the first magnetizer and the movable member is a second distance, and the first distance is greater than the second distance;

at the first position, the first magnetizer presses against the surface of the first side, and an end of the moving part presses against the first elastic part, so that the first elastic part has elastic pre-pressure.

According to some embodiments of the present disclosure, the first magnetizer, the fixing part and the first elastic part are arranged between the pair of the static contact leading-out terminals.

According to some embodiments of the present disclosure, the first elastic part comprises a reed or a spring.

According to some embodiments of the present disclosure, a moving direction of the first magnetizer relative to the movable member is a direction in which the movable contact piece is in contact with or separated from the static contact leading-out terminals.

According to some embodiments of the present disclosure, the moving part is movably arranged at a side of the movable member facing the static contact leading-out terminals, and the moving part is located between the pair of the static contact leading-out terminals.

According to some embodiments of the present disclosure, the moving part is made of a metal material.

According to some embodiments of the present disclosure, the insulating cover comprises a ceramic cover, the pair of first through holes are formed on the ceramic cover; one end of the connector in the axial direction is fixedly connected with the ceramic cover.

According to some embodiments of the present disclosure, the ceramic cover is provided with a third through hole, the connector passes through the third through hole, one end of the connector in the axial direction is connected to a periphery of the third through hole of the ceramic cove.

According to some embodiments of the present disclosure, the connector comprises:

an inserting part, the inserting part has a tubular structure, the inserting part is inserted into the third through hole, one end of the inserting part is connected to the fixing part;

a flange protruding from one peripheral surface of the inserting part far away from the fixing part, the flange is connected with a periphery of the third through hole of the ceramic cover.

According to some embodiments of the present disclosure, a base of the tubular structure is connected to the fixing part; the flange extends radially from an opening edge of the tubular structure to an outside of the tubular structure.

According to some embodiments of the present disclosure, the movable member further comprising:

a second magnetizer, the second magnetizer being fixedly connected to one side of the movable contact piece facing away from the first magnetizer, and the second magnetizer is configured to form a magnetic circuit together with the first magnetizer.

The reference numbers are listed as follows:

10. contact container; 101. contact chamber; 102. first through hole; 103. third through hole;

11*a*. insulating cover; 11. ceramic cover; 12. frame piece; 13. yoke plate; 131. second through hole; 20. static contact leading-out terminal;

40. first magnetizer; 410. magnetic conductive sheet; 420. third perforation;

50. pushing rod assembly; 51. rod; 52. base; 53. movable member; 54. movable contact piece;

55. second magnetizer; 56. second elastic part; 57. sliding structure; 571. limiting part; 572. limiting hole;

60. fixing member; 610. connector; 611. inserting part; 612. flange; 620. fixing part; 621. first side; 622. second side; 623. first perforation;

70. first elastic part; 701. avoidance notch; 710. elastic reed; 711. second perforation; 720. spring; 730. pressing piece;

80. moving part; 810. pressing cap; 820. rod body; 821. step structure;
1100. shell; 1110. first housing; 1120. second housing; 1130. exposed hole;
1200. electromagnet unit; 1210. bobbin; 1220. coil; 1230. static core; 1231; through hole; 1240. movable core; 1250. reset part;
1300. arc extinguishing unit; 1310. arc extinguishing magnet; 1320. yoke clip;
1400. sealing unit; 1410. metal cover;
P1. first position; P2. second position

DETAILED DESCRIPTION

Now, the exemplary implementations will be described more completely with reference to the accompanying drawings. However, the exemplary implementations can be implemented in various forms and should not be construed as limiting the implementations as set forth herein. Instead, these implementations are provided so that the present disclosure will be thorough and complete, and concept of the exemplary implementation will be fully conveyed to a skilled person in the art. Same reference numbers denote the same or similar structures in the figures, and thus the detailed description thereof will be omitted.

Figure 1:
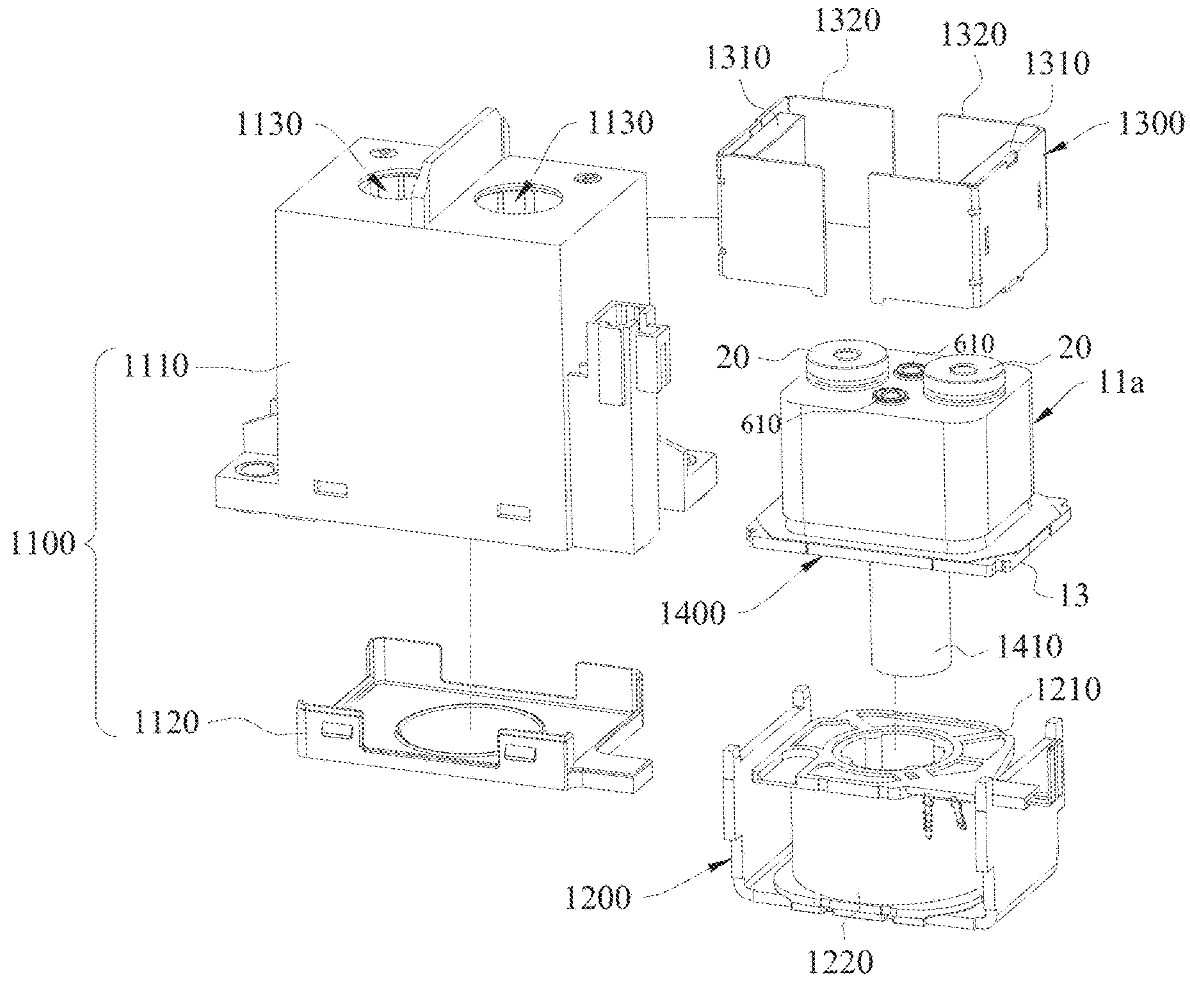
FIG. 1 shows a schematic exploded view of a relay according to a first embodiment of the present disclosure.

As shown in FIG. 1, a relay according to embodiments of the present disclosure includes a shell 1100, an electromagnet unit 1200, an arc extinguishing unit 1300 and a sealing unit 1400. The sealing unit 1400 is arranged within the shell 1100, and a top of the static contact leading-out terminal of the sealing unit 1400 is exposed out of an outer surface of the shell 1100 through an exposed hole 1130 of the shell 1100. Both the electromagnet unit 1200 and the arc extinguishing unit 1300 are arranged within the shell 1100.

Spec Heading Sub

It can be understood that terms "include" and "have" in the embodiments of the present disclosure and any variations thereof are intended to cover non-exclusive inclusion. For example, a process, a method, a system, a product, or a device that includes a series of steps or units is not limited to listed steps or units, but may optionally include unlisted steps or units or optionally include other steps or components inherent to the process, method, product, or device.

As an example, the shell 1100 includes a first housing 1110 and a second housing 1120, which are engaged with each other to form a chamber for accommodating the electromagnet unit 1200, the arc extinguishing unit 1300 and the sealing unit 1400.

The arc extinguishing unit 1300 is configured to extinguish an arc generated between the static contact leading-out terminals and the movable contact piece of the sealing unit 1400.

As an example, the arc extinguishing unit 1300 includes two arc extinguishing magnets 1310. The arc extinguishing magnets 1310 may be permanent magnets, and each of the arc extinguishing magnets 1310 may be substantially cuboid. The two arc extinguishing magnets 1310 are respectively arranged at both sides of the sealing unit 1400 and are oppositely arranged along a length direction of the movable contact piece.

By arranging two arc extinguishing magnets 1310 opposite to each other, a magnetic field may be formed around the static contact leading-out terminals and the movable contact piece. Therefore, the arc generated between the static contact leading-out terminals and the movable contact piece may be drawn long in a direction away from each other under the action of the magnetic field so as to realize arc extinction.

The arc extinguishing unit 1300 further includes two yoke clips 1320. The yoke clips 1320 are arranged corresponding to positions of the two arc extinguishing magnets 1310. Furthermore, the two yoke clips 1320 surround the sealing unit 1400 and the two arc extinguishing magnets 1310. Due to a design of the yoke clips 1320 surrounding the arc extinguishing magnets 1310, the magnetic field generated by the arc extinguishing magnets 1310 can be prevented from spreading outward, which will affect the arc extinguishing effect. The yoke clip 1320 is made of soft magnetic materials. The soft magnetic materials may include, but not limited to iron, cobalt, nickel, and alloys, etc.

Figure 2:
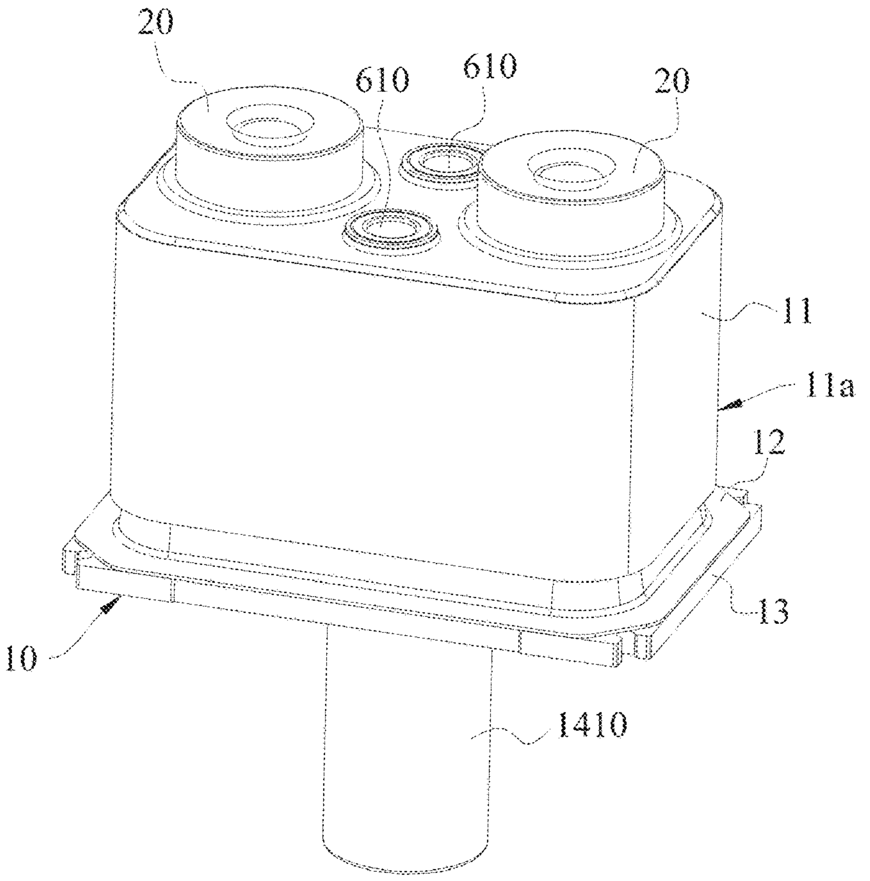
FIG. 2 is a schematic perspective view of the relay according to the first embodiment of the present disclosure, in which a housing, an electromagnet unit and an arc extinguishing unit are omitted.
Figure 3:
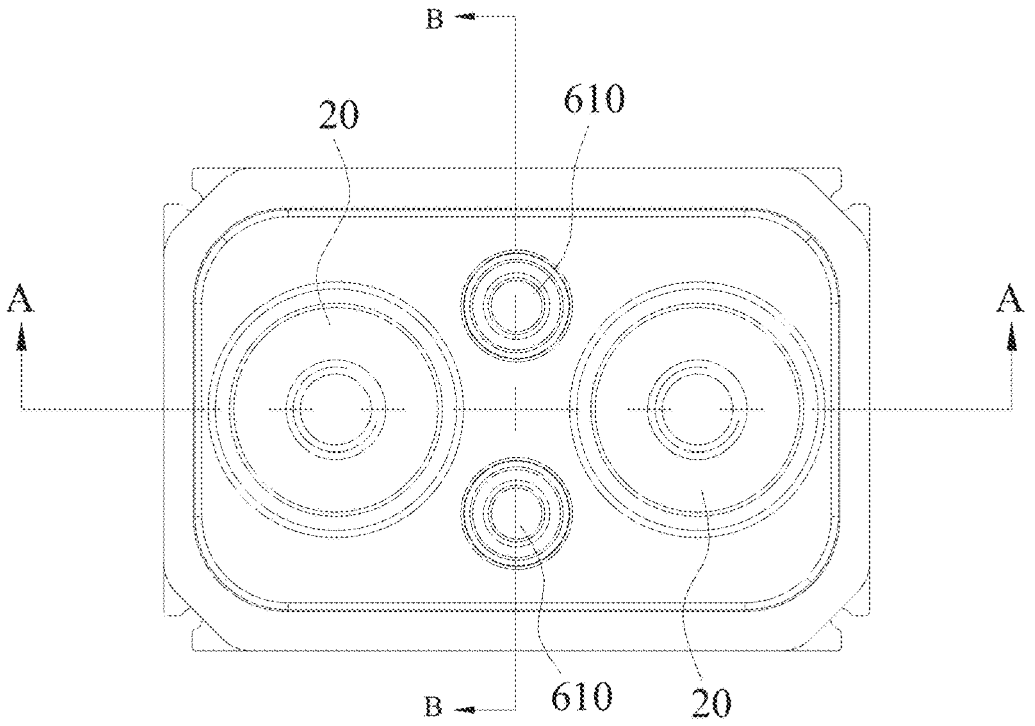
FIG. 3 is a schematic plan view of the relay according to the first embodiment of the present disclosure, in which the housing, the electromagnet unit and the arc extinguishing unit are omitted.
Figure 4:
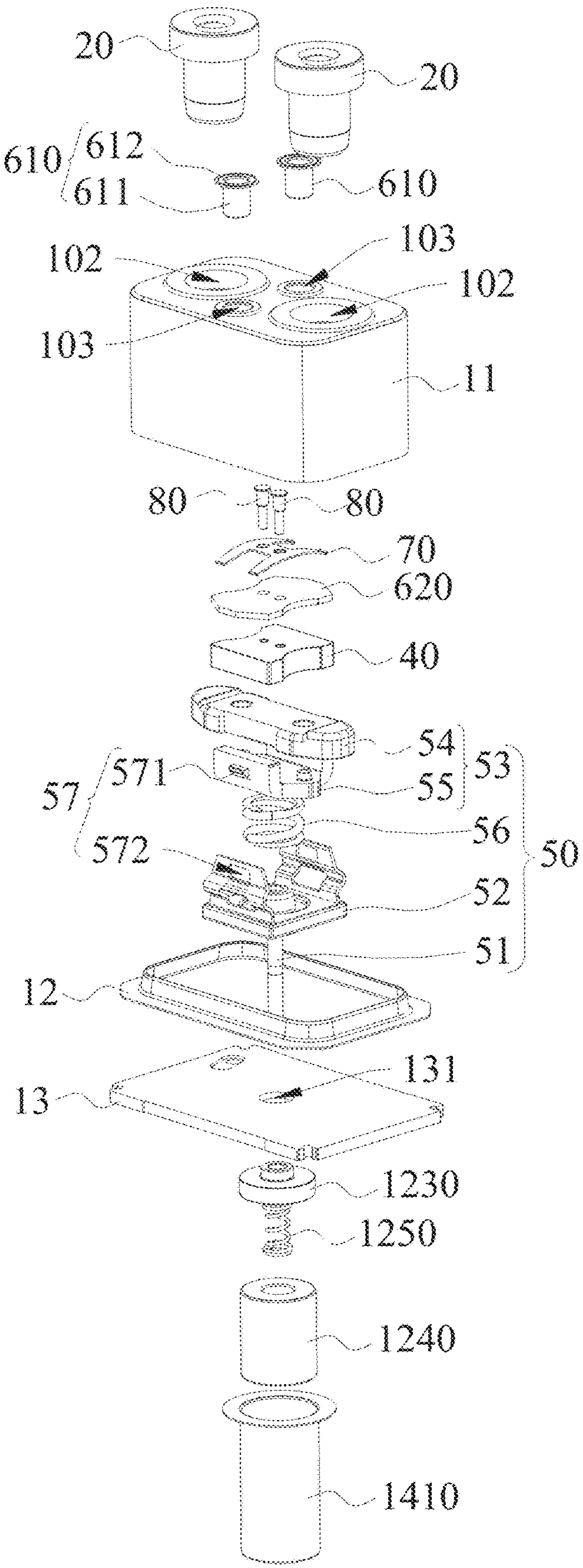
FIG. 4 is a schematic exploded view of FIG. 2.

As shown in FIGS. 2 to 4, the sealing unit 1400 according to the embodiments of the present disclosure includes a contact container 10, a pair of static contact leading-out terminals 20, a pushing rod assembly 50, a first magnetizer 40, a moving part 80, a fixing member 60 and a first elastic part 70.

It can be understood that the contact container 10 is a static part for accommodating a contact assembly. The contact container 10 mainly may be a housing with a chamber. In addition, the contact container 10 may be formed by connecting a plurality of parts in a predetermined assembling manner.

The contact container 10 has a contact chamber 101 inside thereof. The contact container 10 may include an insulating cover 11*a* and a yoke plate 13. The insulating cover 11*a* is covered on a side surface of the yoke plate 13. The insulating cover 11*a* and the yoke plate 13 together enclose to form the contact chamber 101.

The insulating cover 11*a* includes a ceramic cover 11 and a frame piece 12. The ceramic cover 11 is connected with the yoke plate 13 through the frame piece 12. The frame piece 12 may be a metal piece in an annular structure, such as iron-nickel alloy. One end of the frame piece 12 is connected to an opening edge of the ceramic cover 11, for example, by laser welding, brazing, resistance welding, gluing, etc. The other end of the frame piece 12 is connected to the yoke plate 13, also by laser welding, brazing, resistance welding, gluing, etc. The frame piece 12 is arranged between the ceramic cover 11 and the yoke plate 13, which can facilitate the connection between the ceramic cover 11 and the yoke plate 13.

The contact container 10 further has a pair of first through holes 102 which are in communication with the contact chamber 101. The first through hole 102 is configured to allow the static contact leading-out terminals 20 to pass through. In the embodiments of the present disclosure, the first through hole 102 is formed on the ceramic cover 11.

A pair of static contact leading-out terminals 20 is connected to the ceramic cover 11 of the contact container 10, and at least portion of each of the static contact leading-out terminals 20 is located within the contact chamber 101. One of the pair of static contact leading-out terminals 20 serves as a terminal into which the current flows and the other one thereof serves as a terminal out of which current flows.

A pair of static contact leading-out terminals 20 are passed through a pair of first through holes 102 in one-to-one correspondence, and connected to the ceramic cover 11, for example, by welding.

The bottom portions of the static contact leading-out terminals 20 serve as static contacts, and the static contacts may be integrally or separately arranged at the bottom portions of the static contact leading-out terminals 20.

As shown in FIG. 4, the pushing rod assembly 50 is movably connected to the contact container 10 in an axial direction of the rod. The pushing rod assembly 50 may include a rod 51, a base 52, a movable member 53 and a second elastic part 56.

The yoke plate 13 has a second through hole 131. The second through hole 131 passes through two opposite sides of the yoke plate 13 along a thickness direction of the yoke plate 13 and is in communication with the contact chamber 101 of the contact container 10. The rod 51 movably passes through the second through hole 131 in an axial direction. A base 52 is arranged at an end of the rod 51 in the axial direction, and at least portion of the base 52 is located within the contact chamber 101.

The movable member 53 is movably connected to the base 52 in an axial direction of the rod 51. The movable member 53 includes a movable contact piece 54 and a second magnetizer 55. The second magnetizer 55 is fixedly connected with the movable contact piece 54. The second magnetizer 55 is located at a side of the movable contact piece 54 facing away from the first magnetizer 40. The second magnetizer 55 is configured to form a magnetic circuit with the first magnetizer 40. Both ends of the movable contact piece 54 are contacted with the bottom portions of the pair of static contact leading-out terminals 20 to close the contacts. The movable contact piece 54 includes a contact piece and movable contacts arranged at both ends of the contact piece in a length direction. The movable contacts may protrude from the contact piece or be flush with the contact piece.

It can be understood that the movable contacts may be integrally or separately arranged at both ends of the contact piece.

The second elastic part 56 is connected to the movable member 53 and the base 52, for applying an elastic force to move the movable member 53 toward the static contact leading-out terminals 20.

The pushing rod assembly 50 further includes a sliding structure 57. The sliding structure 57 is connected to the base 52 and the movable member 53. The movable member 53 is slidably relative to the base 52 through the sliding structure 57. The sliding structure 57 includes a limiting hole 572 and a limiting part 571 in cooperation with each other. The limiting part 571 may slidably extend into the limiting hole 572.

In the embodiments of the present disclosure, the base 52 is directly connected with the movable member 53 through the sliding structure 57, so that the assembling between the base 52 and the movable member 53 is simpler. Moreover, since there are no other parts between the movable member 53 and the first magnetizer 40, it is avoided that the other parts interfere with the first magnetizer 40 during an over-travel.

It can be understood that the limiting hole 572 may be a through hole or a blind hole.

As an example, the base 52 is provided with a limiting hole 572, and the movable member 53 is provided with a limiting part 571.

Of course, in other embodiments, the pushing rod assembly 50 may also have other structures, which are not listed herein.

Figure 5:
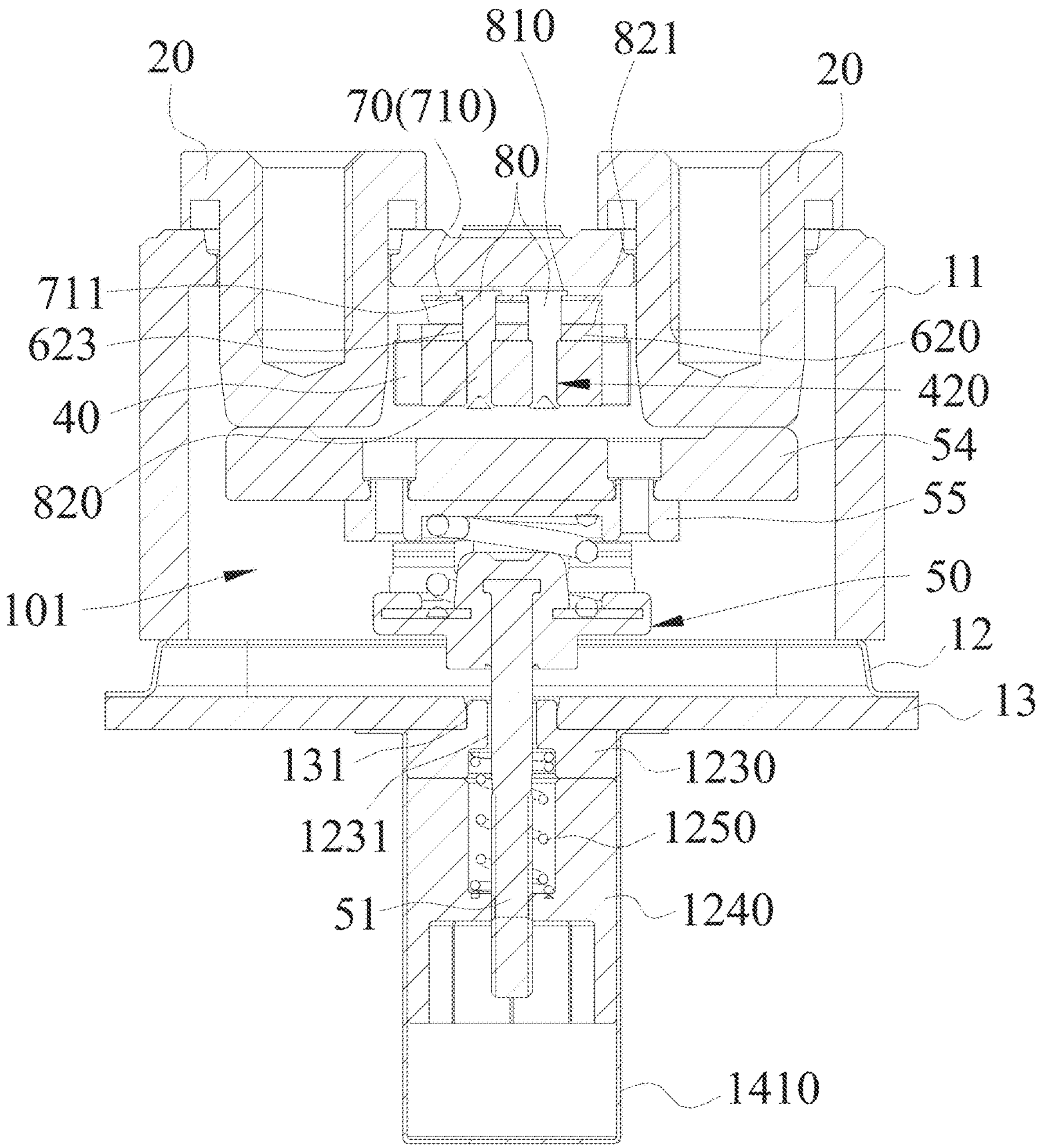
FIG. 5 is a cross-sectional view taken along a line A-A in FIG. 3, in which a first magnetizer is in a first position.
Figure 6:
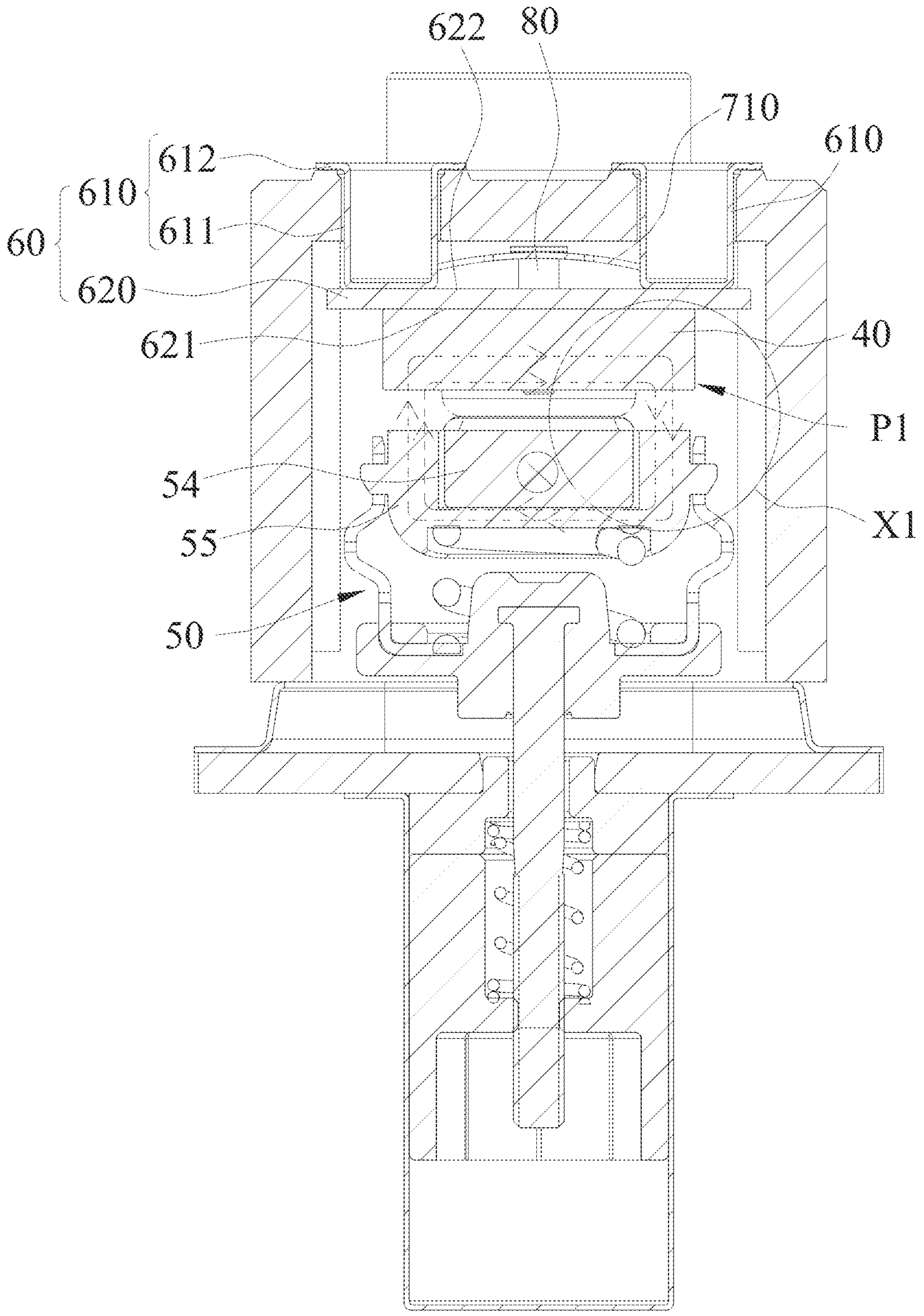
FIG. 6 is a cross-sectional view taken along a line B-B in FIG. 3, in which a first magnetizer is in a first position.

As shown in FIGS. 4 to 6, the sealing unit 1400 further includes a metal cover 1410. The metal cover 1410 is connected to a side of the yoke plate 13 facing away from the insulating cover 11*a*. The metal cover 1410 covers the second through hole 131 on the yoke plate 13. The metal cover 1410 and the yoke plate 13 enclose to form a chamber for accommodating the static core 1230 and the movable core 1240 of the electromagnet unit 1200.

The electromagnet unit 1200 includes a bobbin 1210, a coil 1220, a static core 1230, a movable core 1240, and a reset part 1250. The bobbin 1210 has a hollow tubular shape and is formed of an insulating material. The metal cover 1410 is inserted into the bobbin 1210. The coil 1220 surrounds the bobbin 1210. The static core 1230 is fixedly arranged in the metal cover 1410, and a part of the static core 1230 extends into the second through hole 131. The static core 1230 has a through hole 1231. The through hole 1231 is aligning with the second through hole 131, for the rod 51 to pass through. The movable core 1240 is movably arranged within the metal cover 1410 and is arranged opposite to the static core 1230. The movable core 1240 is connected with the rod 51, to be attracted by the static core 1230 when the coil 1220 is powered on. The movable core 1240 and the rod 51 may be connected by screwing, riveting, welding or other means.

The reset part 1250 is located within the metal cover 1410 and is arranged between the static core 1230 and the movable core 1240, and is configured to reset the movable core 1240 when the coil 1220 is powered off. The reset part 1250 may be a spring and is sleeved outside the rod 51.

It should be noted that when the coil 1220 is powered on, the electromagnet unit 1200 may drive the pushing rod assembly 50 upward through the rod 51. When the movable member 53 is in contact with the static contact leading-out terminals 20, the movable member 53 is stopped by the static contact leading-out terminals 20, and the rod 51 and the base 52 may continue to move upward until the over-travel is completed.

Referring to FIGS. 4 to 6, the first magnetizer 40 is arranged within the contact chamber 101, and the first magnetizer 40 is arranged at a side of the movable contact piece 54 facing the static contact leading-out terminals 20. The fixing member 60 is fixedly connected to the insulating cover of the contact container 10. The moving part 80 is movably mounted to the fixing member 60. The first magnetizer 40 is arranged within the contact chamber 101 and connected with the moving part 80, and the first magnetizer 40 is movable relative to the movable member 53 through the moving part 80.

In the embodiments of the present disclosure, the limiting part 571 may be arranged at the second magnetizer 55, but it is not limited thereto.

As an example, the second magnetizer 55 and the movable contact piece 54 may be fixedly connected by rivets, but it is not limited thereto.

It can be understood that both the first magnetizer 40 and the second magnetizer 55 may be made of materials such as iron, cobalt, nickel and alloys thereof.

In an embodiment, the first magnetizer 40 may be in a linear shape or a U-shape, and the second magnetizer 55 may be in a linear shape or a U-shape, but it is not limited thereto.

When both ends of the movable contact piece 54 are in contact with the pair of static contact leading-out terminals 20, the second magnetizer 55 that move together with the movable contact piece 54 approaches to or contacts with the first magnetizer 40, thereby forming a magnetic circuit around the movable contact piece 54 between the first magnetizer 40 and the second magnetizer 55. When a short circuit current passes through the movable contact piece 54, a magnetic attraction force along a contact pressure direction is generated between the first magnetizer 40 and the second magnetizer 55. The magnetic attraction force can resist an electro-dynamic repulsion force between the movable contact piece 54 and the static contact leading-out terminals 20 due to the short circuit current, and ensure that the movable contact piece 54 and the static contact leading-out terminals 20 do not bounce off.

It should be noted that the first magnetizer 40 and the second magnetizer 55 are located at both sides of the movable contact piece 54, respectively. When the movable contact piece 54 is powered on, the magnetic attraction force between the first magnetizer 40 and the second magnetizer 55 is a direct electromagnetic attraction force, so that it can more effectively resist the electro-dynamic repulsion force caused by short circuit current between the movable contact piece 54 and the static contact leading-out terminals 20, and effectively improve the anti-short circuit ability.

As described above, a magnetic attraction force along the contact pressure direction may be generated between the first magnetizer 40 and the second magnetizer 55. The magnetic attraction force can resist the electro-dynamic repulsion force caused by short circuit current between the movable contact piece 54 and the static contact leading-out terminals 20, and ensure that the movable contact piece 54 and the static contact leading-out terminals 20 may not bounce off.

It can be understood that when current flowing through the movable contact piece 54 is constant, the magnitude of the magnetic attraction force generated between the first magnetizer 40 and the second magnetizer 55 is inversely proportional to a distance between the first magnetizer 40 and the second magnetizer 55 of the movable member 53, that is, the smaller the distance, the greater the magnetic attraction force generated.

In order to resist the electromotive repulsion generated by the short circuit current and prevent the movable contact piece 54 from bouncing off the static contact leading-out terminals 20, the distance between the first magnetizer 40 and the second magnetizer 55 should be designed to be small, as such, the magnetic attraction force between the first magnetizer 40 and the second magnetizer 55 can be increased.

For convenience to realize timely breaking, the distance between the first magnetizer 40 and the second magnetizer 55 should be designed to be large, as such, the magnetic attraction force between the first magnetizer 40 and the second magnetizer 55 may be reduced so as to avoid affecting the timely breaking due to the excessive magnetic attraction force.

As can be seen, when the distance between the first magnetizer 40 and the second magnetizer 55 is a certain value, it is impossible to take both the anti-short circuit ability and the limit breaking ability into account.

In the embodiment of the present disclosure, the first magnetizer 40 is movable relative to the movable member 53 through the moving part 80, and then the distance between the first magnetizer 40 and the second magnetizer 55 is adjusted according to the value of the current flowing through movable contact piece 54, so as to achieve the anti-short circuit ability and the limit breaking ability. In some embodiments, the distance between the first magnetizer 40 and the second magnetizer 55 is different, for example, when the first magnetizer 40 and the second magnetizer 55 are not parallel to each other, at different positions, the distances between the first magnetizer 40 and the second magnetizer 55 are different. In this case, the distance between the first magnetizer 40 and the second magnetizer 55 refers to the maximum distance between them.

As shown in FIGS. 5 to 10, the first magnetizer 40 moves between a first position P1 and a second position P2 through the moving part 80. At the first position P1, a distance between the first magnetizer 40 and the second magnetizer 55 is a first distance H1. At the second position P2, a distance between the first magnetizer 40 and the second magnetizer 55 is a second distance H2, and the first distance H1 is greater than the second distance H2. By setting the first magnetizer 40 movable, the distance between the first magnetizer 40 and the second magnetizer 55 can be adjusted according to the current value, and then the magnetic attraction force generated between the first magnetizer 40 and the second magnetizer 55 can be changed, so as to achieve the anti-short circuit and limit breaking.

As an example, at the second position P2, the second distance H2 between the first magnetizer 40 and the second magnetizer 55 is equal to zero. That is, at the second position P2, the first magnetizer 40 and the second magnetizer 55 are in contact with each other. In this way, the magnetic attraction force between the first magnetizer 40 and the second magnetizer 55 can be maximized to improve the anti-short circuit ability.

Of course, in other embodiments, at the second position P2, the second distance H2 between the first magnetizer 40 and the second magnetizer 55 may not be equal to zero. That is, at the second position P2, there is no contact between the first magnetizer 40 and the second magnetizer 55, but there is a gap therebetween.

The first elastic part 70 is configured to provide an elastic force for the moving part 80, so that the first magnetizer 40 has a trend of moving away from the movable member 53. In the embodiments of the present disclosure, the first elastic part 70 is configured to provide an elastic force for the moving part 80, so that the first magnetizer 40 has a trend of moving toward the first position P1.

Hereinafter, the achievement of the anti-short circuit current and the limit breaking according to the embodiment of the present disclosure may be illustrated in conjunction with the FIGS. 5 to 10.

Figure 7:
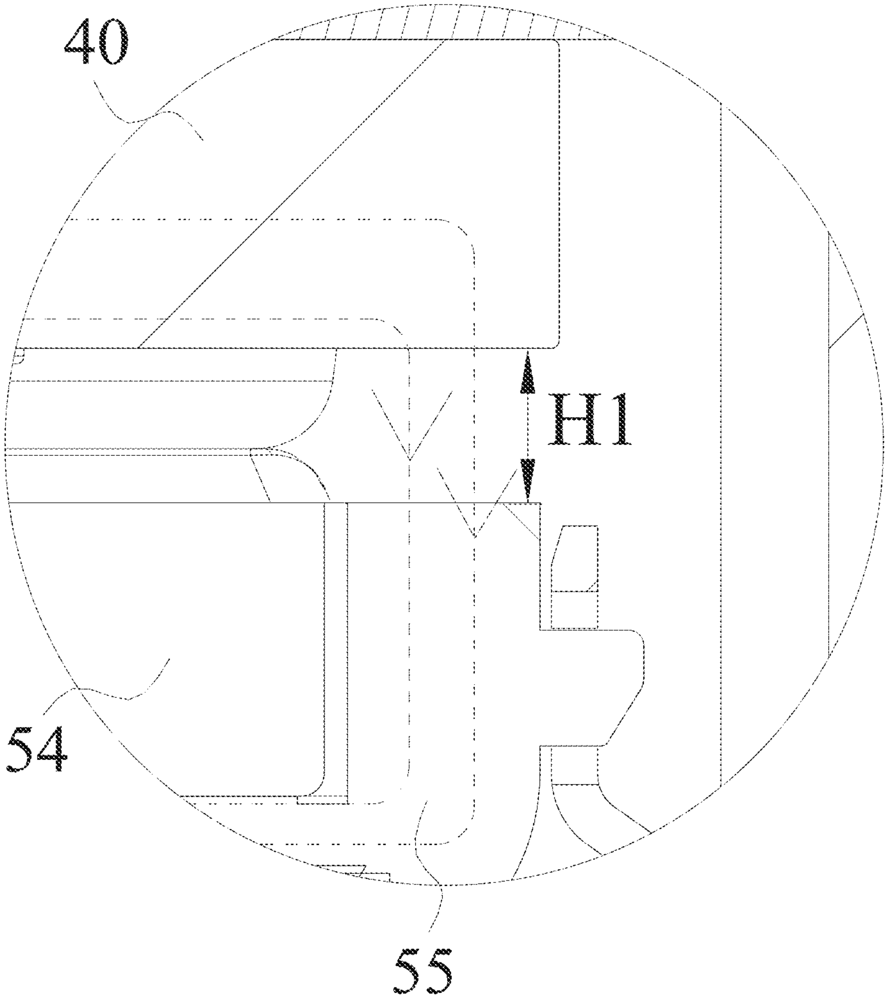
FIG. 7 shows a partial enlarged view of X1 in FIG. 6.

As shown in FIGS. 5 to 7, when the relay is in a normal working state, the current value of the movable contact piece 54 is less than or equal to a threshold current, for example, the current value is less than 2000 A. As the current value is small, the magnetic attraction force between the first magnetizer 40 and the second magnetizer 55 is also small, and the magnetic attraction force is less than the elastic pre-pressure of the first elastic part 70, as such, the elastic force of the first elastic part 70 can offset the magnetic attraction force between the first magnetizer 40 and the second magnetizer 55 and allow the first magnetizer 40 to maintain in the first position P1. When the first magnetizer 40 is located in the first position P1, the distance between the first magnetizer 40 and the second magnetizer 55 is a first distance H1. For example, the first distance H1 may be 1.5 mm, but it is not limited thereto.

It can be understood that the above threshold current can be adjusted according to different types of relays. For example, if the maximum breaking current of the relay is large, the threshold current may also be set to be large. This can ensure that the first magnetizer 40 can remain in the first position P1 but not move toward the second position P2 under the normal working state of the relay.

Figure 8:
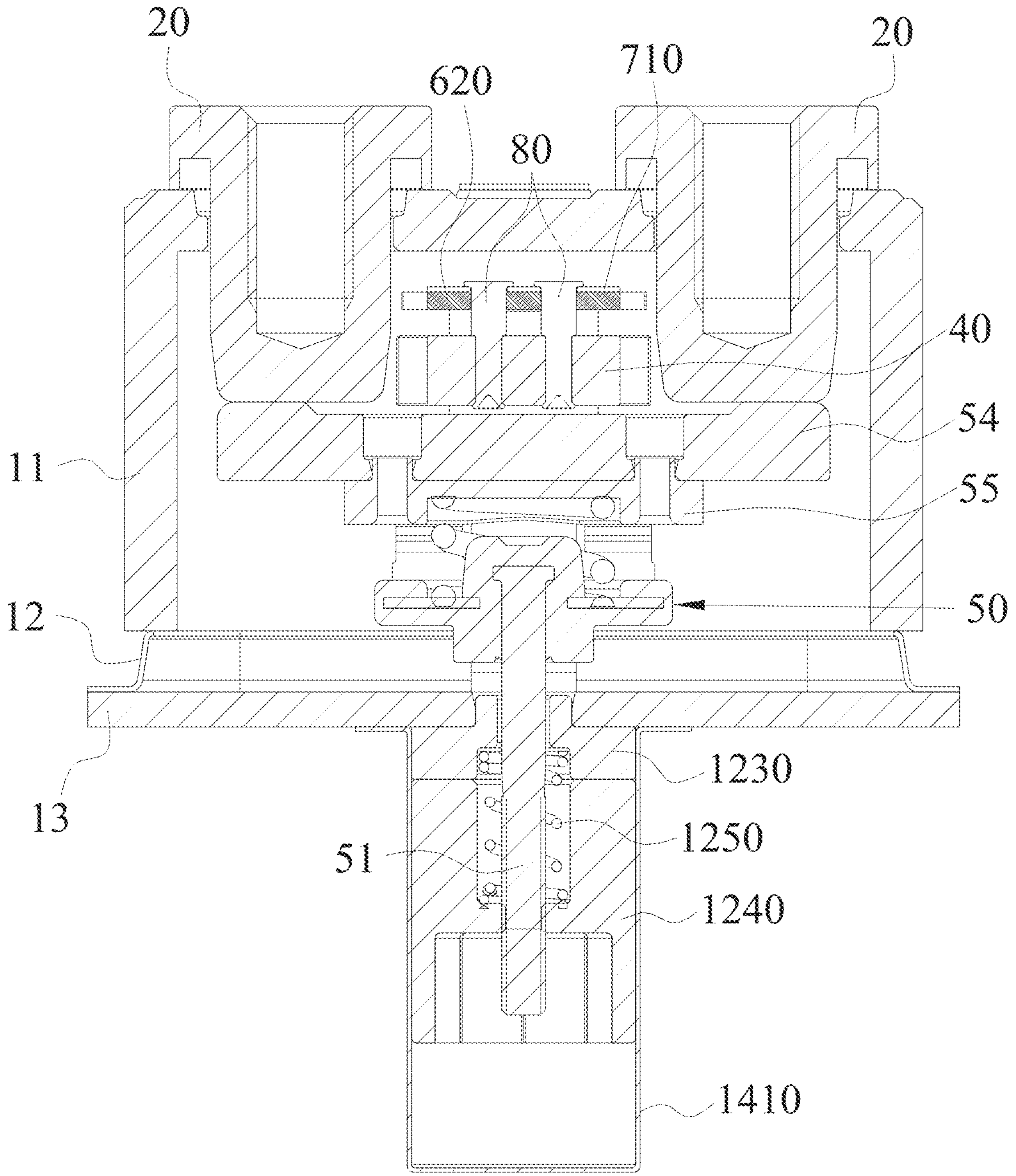
FIG. 8 is a cross-sectional view taken along a line A-A in FIG. 3, in which a first magnetizer is in a second position.
Figure 9:
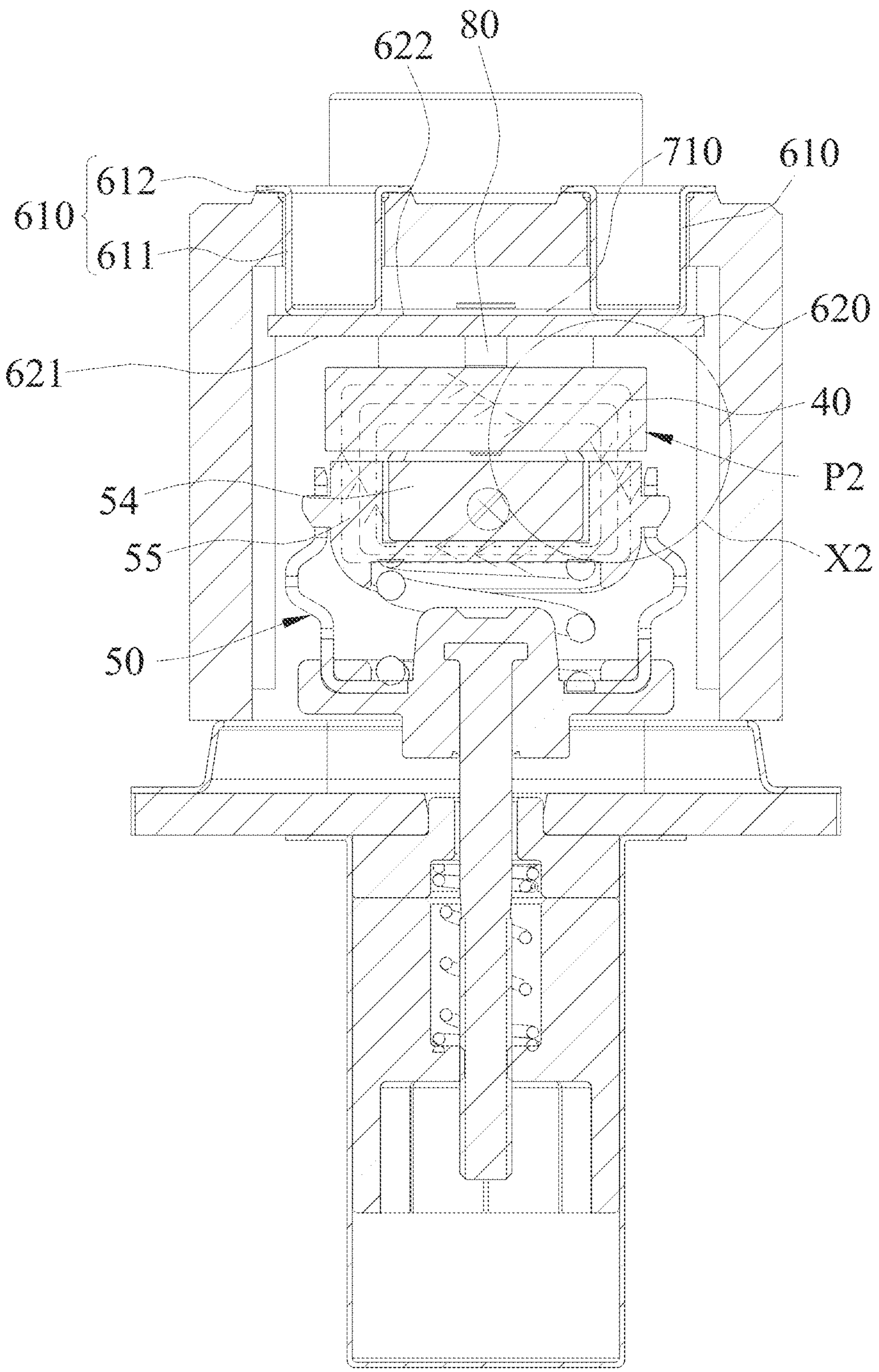
FIG. 9 is a cross-sectional view taken along a line B-B in FIG. 3, in which a first magnetizer is in a second position.
Figure 10:
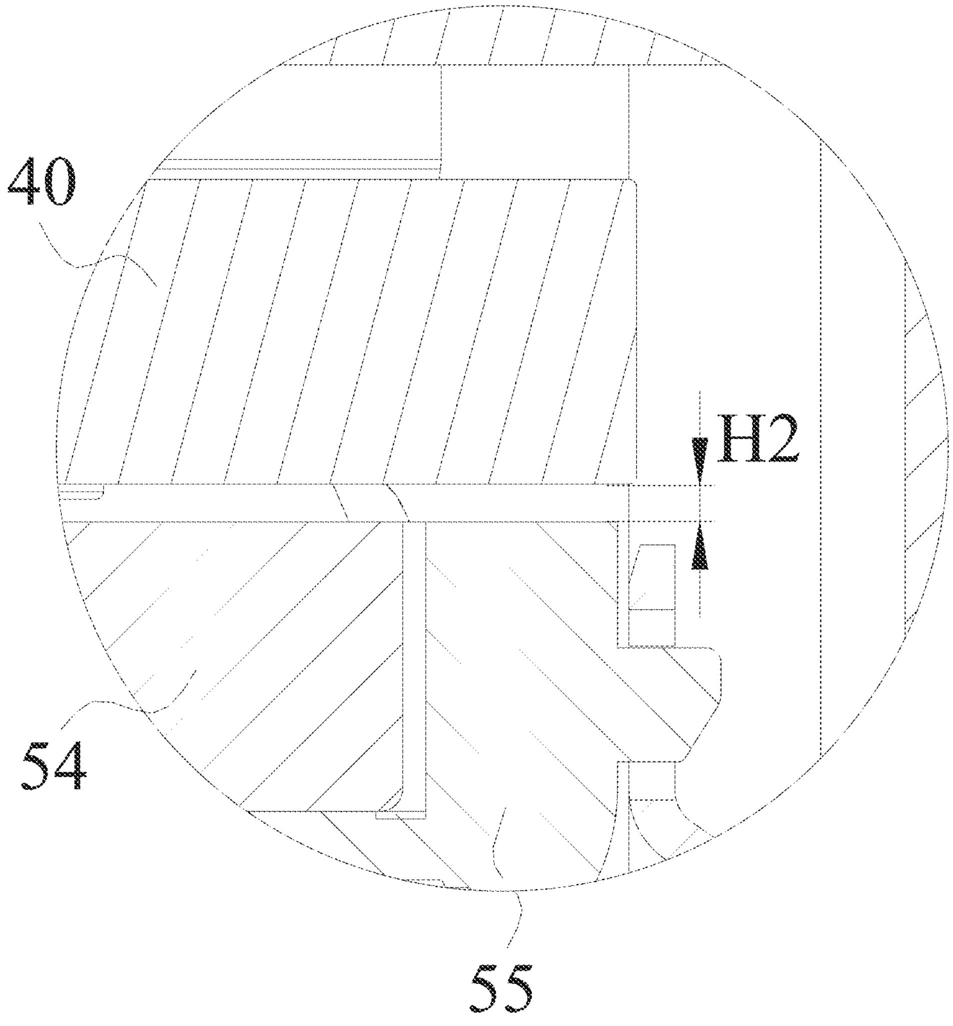
FIG. 10 shows a partial enlarged view of X2 in FIG. 9.

As shown in FIG. 8 to FIG. 10, when the current value of the movable contact piece 54 is greater than the threshold current, the current is, for example, greater than 2000 A. Since the magnetic attraction force between the first magnetizer 40 and the second magnetizer 55 is proportional to the current value, the greater the current value, the greater the magnetic attraction force between the first magnetizer 40 and the second magnetizer 55. When the magnetic attraction force is greater than the elastic pre-pressure of the first elastic part 70, the first magnetizer 40 is attracted by the magnetic attraction force to move toward a direction close to the second magnetizer 55 (that is, moving from the first position P1 to the second position P2), so that the distance between the first magnetizer 40 and the second magnetizer 55 becomes smaller. Since the magnetic distance is inversely proportional to the magnetic attraction force, the smaller the magnetic distance, the greater the magnetic attraction force. When the short circuit current (much greater than the threshold current) flows over, a greater magnetic attraction force is generated between the first magnetizer 40 and the second magnetizer 55. This magnetic attraction force can compress the first elastic part 70 to move the first magnetizer 40 to the second position P2, and the distance between the first magnetizer 40 and the second magnetizer 55 is a second distance H2. The second distance H2 is smaller than the first distance H1. The distance becomes smaller, so that the magnetic attraction force between the first magnetizer 40 and the second magnetizer 55 becomes greater. Therefore, the first magnetizer 40 can attract the second magnetizer 55 through the great magnetic attraction force, and the magnetic attraction force can resist the electro-dynamic repulsion force generated by the short circuit current, thus ensure that the movable contact piece 54 does not bounce off the static contact leading-out terminals 20, thus achieving anti-short circuit ability.

As can be seen, in the relay according to the embodiments of the present disclosure, the first magnetizer 40 is movably arranged within the contact container 10 through the moving part 80, so that the distance between the first magnetizer 40 and the second magnetizer 55 can be adjusted according to the current value, thereby changing the magnitude of magnetic attraction force generated between the first magnetizer 40 and the second magnetizer 55. This can meet the overload breaking requirement while satisfying the anti-short circuit ability.

It is worth mentioning that when the first magnetizer 40 moves from the first position P1 to the second position P2, the first elastic part 70 is gradually compressed, so that a reverse elastic force exerted by the first elastic part 70 at the moving part 80 gradually increases. When the current value of the movable contact piece 54 is greater than the threshold current but not reach the short circuit current, the gradually increasing reverse elastic force can allow the first magnetizer 40 to maintain at a certain intermediate position between the first position P1 and the second position P2. When the current value of the movable contact piece 54 reaches the short circuit current, a greater magnetic attraction force is generated between the first magnetizer 40 and the second magnetizer 55. This magnetic attraction force is enough to overcome the reverse elastic force of the first elastic part 70, so that the first magnetizer 40 continues to move to the second position P2 and further compress the first elastic part 70 until the first magnetizer 40 moves to the second position P2.

Referring back to FIGS. 4 to 6 and FIG. 8, the fixing member 60 includes two connectors 610 and a fixing part 620. One end of each of the two connectors 610 is connected with the contact container 10, and the other end of each of the two connectors 610 is connected with the fixing part 620. The fixing part 620 may have a plate-shaped structure and be arranged in parallel to the yoke plate 13.

The fixing part 620 of the fixing member 60 has a first side 621 facing the yoke plate 13 and a second side 622 arranged opposite to the first side 621. The first elastic part 70 is arranged at the second side 622, the first magnetizer 40 and the movable member 53 are arranged at the first side 621, and the first magnetizer 40 is arranged between the first elastic part 70 and the movable member 53. One end of the moving part 80 is connected with the first elastic part 70, and the other end of the moving part is connected with the first magnetizer 40. The first magnetizer 40, the first clastic part 70 and the fixing member 60 are all located at a side of the movable contact piece 54 facing the static contact leading-out terminals 20.

When the first magnetizer 40 is in the first position P1, the first magnetizer 40 presses against the surface of the first side 621 of the fixing part 620. When the first magnetizer 40 is in the second position P2, the first magnetizer 40 is separated from the fixing part 620.

The connector 610 has a tubular structure, one end of the connector 610 in the axial direction is fixedly connected with the insulating cover 11*a*, and the other end of the connector 610 in the axial direction is connected with the fixing part 620.

In the embodiments of the present disclosure, a top wall of the ceramic cover 11 of the contact container 10 is provided with a third through hole 103, and the connector 610 pass through the third through hole 103. One end of the connector 610 in the axial direction may be connected to the ceramic cover 11 in various ways, such as welding, riveting, screwing and gluing. The other end of the connector 610 may be connected to the fixing part 620 also in various ways, such as welding, riveting, screwing, gluing and clamping.

It can be understood that when one end of the connector 610 is connected to the ceramic cover 11 by welding, by welding the connector 610 to the top wall of the ceramic cover 11, a metallization layer may be processed only at a periphery of the third through hole 103 on an outer wall surface of the top wall, instead of on an inner wall surface of the top wall. This is convenient for processing and simplifies the processing steps.

It can be understood that one end of the connector 610 may be connected to the outer wall surface of the ceramic cover 11, the inner wall surface of the ceramic cover 11, or both.

In the embodiments of the present disclosure, one end of the connector 610 is connected to the periphery of the third through hole 103 of the ceramic cover 11.

It can be understood that the fixing part 620 is connected with the ceramic cover 11 through the connector 610. On the one hand, the magnetic attraction force can be transferred to the ceramic cover 11, in this way, there is no need for excessive coil holding force, thereby reducing power consumption of the coil of the relay, and improving anti-short circuit ability. On the other hand, because the fixing member 60 is connected to the ceramic cover 11, the space of the contact chamber will not be occupied too much, thus ensuring the arc extinguishing space of the arc extinguishing unit and the movable space of the pushing rod assembly.

In addition, the connector 610 is a tubular structure, and the structural strength of the tubular structure is relatively soft. When the connector 610 and the fixing part 620 are connected by riveting, welding, etc., the riveting stress or welding stress generated between the connector 610 and the fixing part 620 transmitted to the joint of the connector 610 and the insulating cover 11*a* through the connector 610 with tubular structure is small, so that the connection strength between the connector 610 and the insulating cover 11*a* is ensured and the reliability of the product is improved.

As shown in FIG. 4 and FIG. 6, the connector 610 includes an inserting part 611 and a flange 612. The inserting part 611 has a tubular structure. The inserting part 611 is inserted into the third through hole 103, and one end of the inserting part 611 is connected to the fixing part 620. The flange 612 protrudes from one peripheral surface of the inserting part 611 far away from the fixing part 620, and the flange 612 is connected to the periphery of the third through hole 103.

The base of the tubular structure is connected to the fixing part 620, the flange 612 extends radially from an opening edge of the tubular structure to an outside of the tubular structure.

It can be understood that the base of the tubular structure is connected to the second side 622 of the fixing part 620 by welding, riveting and gluing, etc.

The moving part 80 may have various shapes, for example, the moving part 80 may be in a column shape. One end of the moving part 80 may be connected with the first elastic part 70 by welding, riveting, screwing and gluing, and the other end of the moving part 80 may also be connected with the first magnetizer 40 also by welding, riveting, screwing and gluing. As a modified embodiment, the shape of the moving part 80 may also have an inverted U shape, a top portion of the inverted U-shaped structure is connected with the first elastic part 70, and the two side portions of the inverted U-shaped structure are connected with the two sides of the first magnetizer 40, respectively.

As an example, the fixing part 620 is suspended from a top wall of the ceramic cover 11 by two connectors 610. Meanwhile, the number of moving parts 80 may be two, but it is not limited thereto. It should be noted that the two connectors 610 may be connected to an inner wall surface of the top wall of the ceramic cover 11 and also to the outer wall surface of the top wall of the ceramic cover 11.

When the moving part 80 is column shape, the fixing part 620 has a first perforation 623 which penetrates through a surface of the first side 621 and a surface of the second side 622. The moving part 80 movably penetrates through the first perforation 623. At the first position P1, the first magnetizer 40 presses against the surface of the first side 621 of the fixing part 620, and one end of the moving part 80 presses against the first elastic part 70, so that the first elastic part 70 has elastic pre-pressure.

It can be understood that, on one aspect, the first magnetizer 40 and the first elastic part 70 are respectively arranged at two opposite sides of the fixing part 620, so that there are no other parts between the first magnetizer 40 and the movable member 53, as such, when a large current flows through the movable contact piece 54 of the movable member 53, the gap between the first magnetizer 40 and the second magnetizer 55 can be minimized, and even the first magnetizer 40 is in contact with the second magnetizer 55, so that the magnetic attraction force between the first magnetizer 40 and the second magnetizer 55 can be increased, to improve the anti-short circuit ability. On the other aspect, since the first elastic part 70 is arranged at the second side 622 of the fixing part 620 but not directly contact with the first magnetizer 40, a magnetic pole surface of the first magnetizer 40 cannot be affected. On a further aspect, the moving part 80 is movably inserted into the first perforation 623 of the fixing part 620, and one end of the moving part 80 presses against the first clastic part 70, and the other end of the moving part 80 is connected with the first magnetizer 40, so that the structure is more compact, the original structure of the relay cannot be changed, and an internal space of the relay cannot be occupied. Moreover, the structure is simple and convenient for assembling. In addition, the first magnetizer 40 directly acts on the moving part 80, and the moving part 80 penetrates through the first perforation 623 of the fixing part 620, so that the force arm, that is, the distance from the magnetic attraction force generated between the first magnetizer 40 and the second magnetizer 55 relative to a pivot formed by the moving part 80 and the first elastic part 70, is not large, and thus developed stress is smaller.

As shown in FIG. 5, the first elastic part 70 has a second perforation 711 aligning with the first perforation 623. The moving part 80 passes through the first perforation 623 and the second perforation 711. The moving part 80 includes a rod body 820 and a pressing cap 810, wherein the pressing cap 810 is arranged at one end of the rod body 820, and the pressing cap 810 is configured to press against the periphery of the second perforation 711 facing away from the side of the first magnetizer 40.

When the first magnetizer 40 moves from the first position P1 to the second position P2 under the action of the magnetic attraction force, the pressing cap 810 of the moving part 80 presses against the first clastic part 70 to compress the first elastic part 70.

It can be understood that one end of the moving part 80 may be fixedly or movably connected with the first elastic part 70, as long as the moving part 80 can exert force on the first elastic part 70 to compress the first elastic part 70 when the first magnetizer 40 moves from the first position P1 to the second position P2.

The first magnetizer 40 is provided with a third perforation 420. The third perforation 420 corresponds to the positions of the first perforation 623 and the second perforation 711. A step structure 821 is arranged at an outer periphery of the rod body 820 of the moving part 80. The step structure 821 is configured to press against the periphery of the third perforation 420 of the first magnetizer 40 facing the side of the first elastic part 70.

When the moving part 80, the first magnetizer 40, the fixing member 60 and the first elastic part 70 are assembled, the moving part 80 sequentially passes through the second perforation 711 of the first elastic part 70, the first perforation 623 of the fixing member 60 and the third perforation 420 of the first magnetizer 40. The step structure 821 of the rod body 820 presses against the periphery of the third perforation 420. One end of the rod body 820 facing the movable member 53 is fixedly connected with the first magnetizer 40, for example, by riveting. The pressing cap 810 presses against the periphery of the second perforation 711.

As shown in FIG. 5, the fixing part 620 of the fixing member 60, the first magnetizer 40 and the first elastic part 70 are all located between the pair of static contact leading-out terminals 20. In this way, the fixing part 620, the first magnetizer 40 and the first elastic part 70 do not occupy a volume of the relay in a height direction, and an overall structure of the relay is more compact, which is conducive to the realization of volume miniaturization.

The moving part 80 is movably arranged at a side of the movable member 53 facing the static contact leading-out terminals 20, and the moving part 80 is located between a pair of static contact leading-out terminals 20.

In an embodiment, both the moving part 80 and the fixing member 60 are made of metal materials to improve connection strength.

Figure 12:
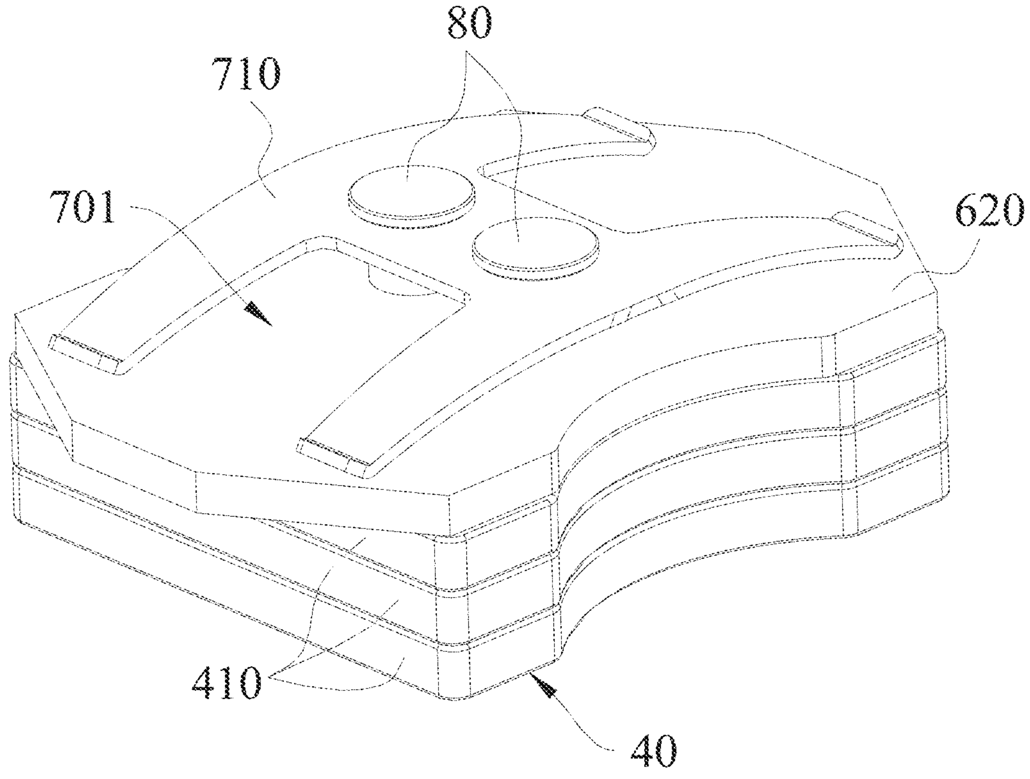
FIG. 12 is a schematic view showing a first magnetizer, a first elastic part and a movable member according to an embodiment of the present disclosure have been assembled.
Figure 13:
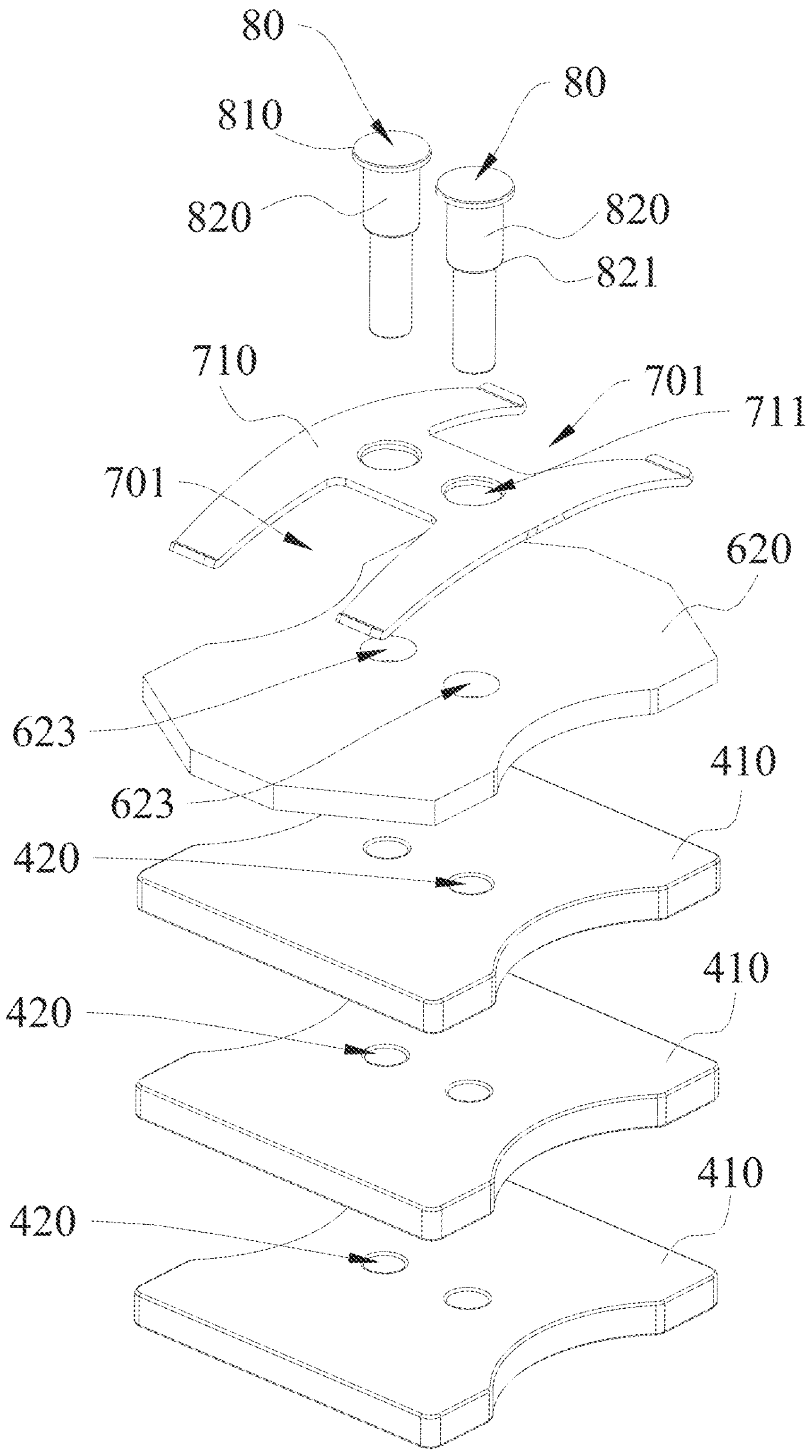
FIG. 13 is an exploded schematic view of FIG. 12.

As shown in FIGS. 12 and 13, the first elastic part 70 may be an elastic reed 710, which can reduce the space occupied by the elastic reed 710 and provide a moving space for the first magnetizer 40.

The second elastic part 56 may also be an elastic reed, which can also reduce the space occupied by the second elastic part 56 and provide a moving space for the first magnetizer 40.

Avoidance notches 701 are arranged at both ends of the elastic reed 710, and the connector 610 passes through the avoidance notches 701. In the embodiments of the present disclosure, the avoidance notches 701 are arranged at both ends of the first elastic part 70, and the two connectors 610 pass through the avoidance notches 701, respectively. By arranging the avoidance notches 701 on the first elastic part 70, the connector 610 can pass through the first elastic part 70 to connect with the fixing part 620, so that the connector 610, the fixing part 620, the first elastic part 70 and the first magnetizer 40 after being assembled can be more compact, and cannot occupy the internal space of the relay.

Of course, the elastic reed 710 may not be provided with the avoidance notches 701; alternatively, the elastic reed 710 is provided with a hole through which the connector 610 passes.

Figure 14:
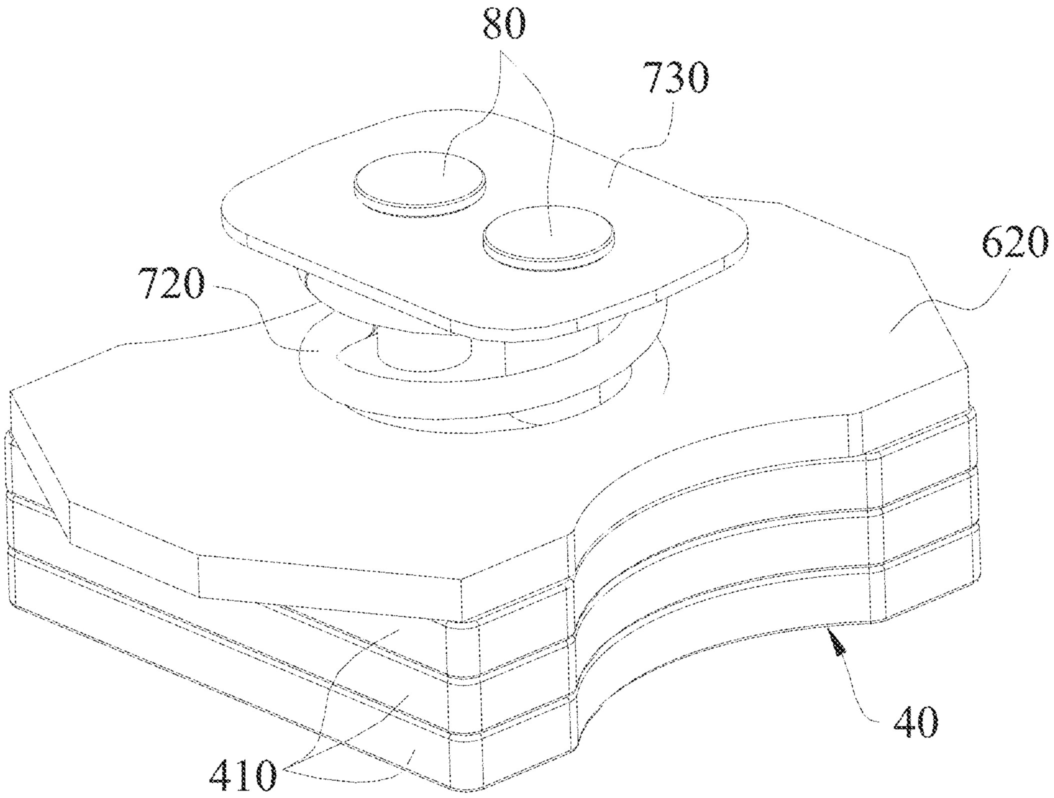
FIG. 14 is a schematic view showing a first magnetizer, a first elastic part and a movable member according to another embodiment of the present disclosure have been assembled.
Figure 15:
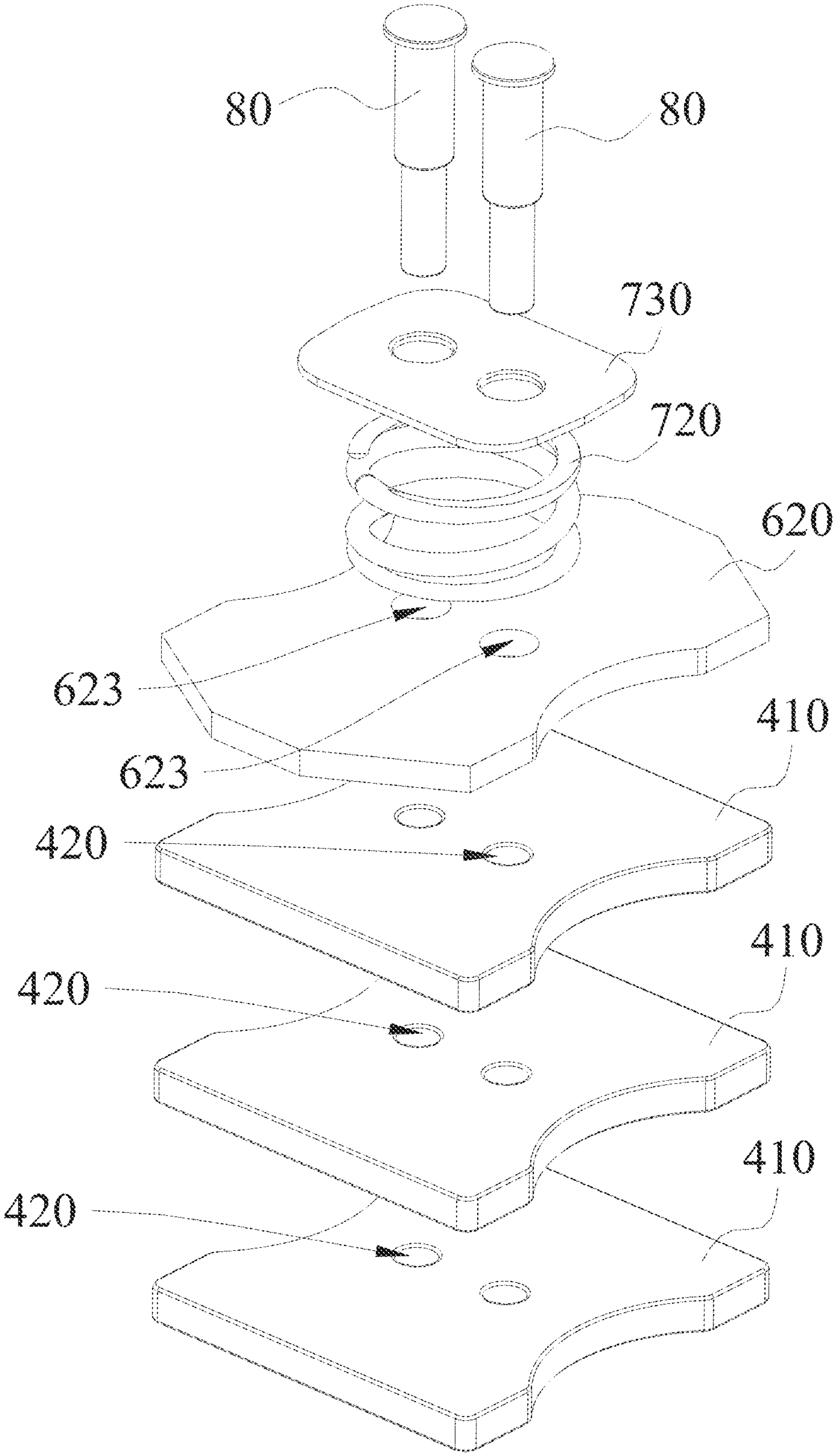
FIG. 15 is an exploded view of FIG. 14.

As shown in FIGS. 14 and 15, as a modified embodiment, the first elastic part 70 may also be a spring 720. One end of the spring 720 presses against the fixing part 620, and the other end of the spring 720 presses against a pressing piece 730. One end of the moving part 80 is connected with the pressing piece 730 and pressed against the other end of the spring 720 through the pressing piece 730, and the other end of the moving part 80 passes through the first perforation 623 of the fixing part 620 and is connected with the first magnetizer 40.

Figure 11:
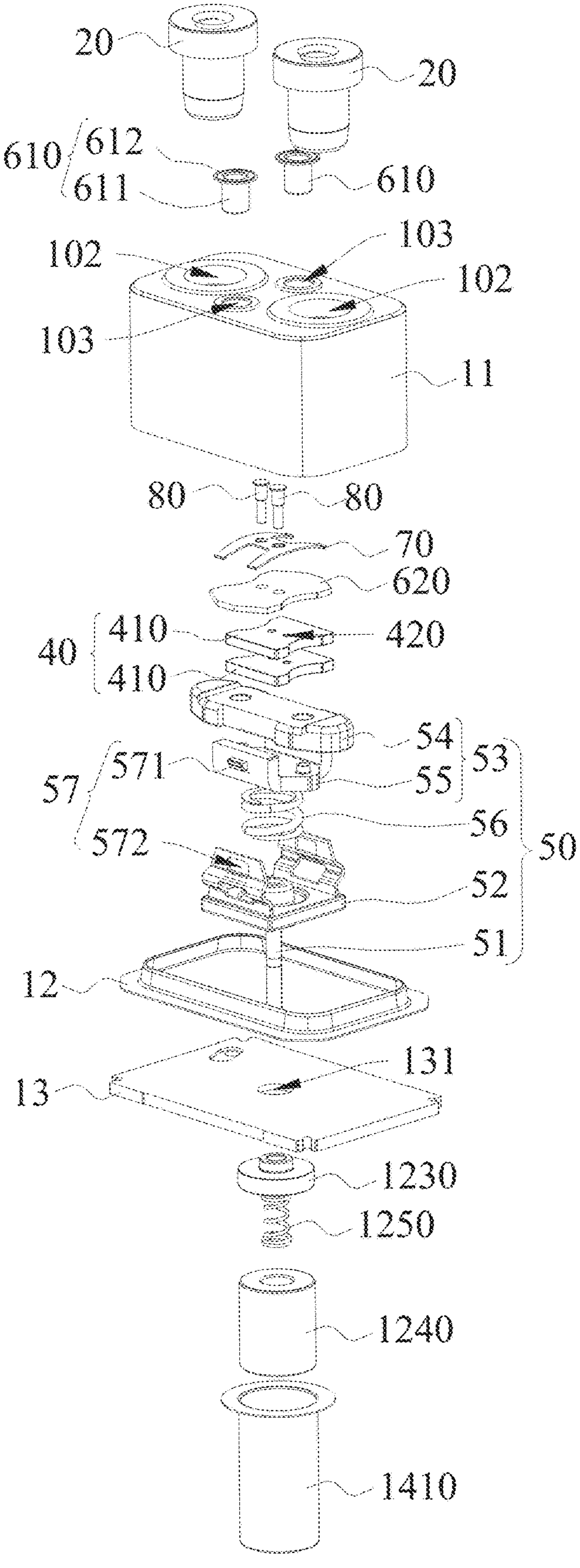
FIG. 11 is a schematic exploded view of the relay according to the second embodiment of the present disclosure, in which a housing, an electromagnet unit and an arc extinguishing unit are omitted.

As shown in FIGS. 11 to 13, the relay according to the second embodiment has substantially the same structure as the relay according to the first embodiment. Therefore, in the description of the second embodiment of the relay below, the structure already described in the first embodiment is not repeated. Additionally, the same reference numbers are used to indicate the same structures as described in the first embodiment. Therefore, in the following description of this embodiment, the differences from the relay of the first embodiment will be mainly described.

In this embodiment, the first magnetizer 40 may include a plurality of magnetic conductive sheets 410 stacked to one another. On one aspect, the magnetic conductive sheets 410 are relatively thin, and may be made of thin strip, at low material cost and easy operation. On the other aspect, the number of the magnetic conductive sheets 410 may be flexibly adjusted according to the magnitude of the short circuit current, thereby increasing or decreasing the thickness of the first magnetizer 40.

Each magnetic conductive sheet 410 is provided with a third perforation 420. After magnetic conductive sheets 410 are stacked, the third perforation 420 are aligned with one another and aligned with the positions of the first perforation 623 and the second perforation 711. When the moving part 80, the first magnetizer 40, the fixing member 60 and the first elastic part 70 are assembled, the moving part 80 sequentially passes through the second perforation 711 of the first elastic part 70, the first perforation 623 of the fixing member 60 and the third perforation 420 of the first magnetizer 40. The step structure 821 of the rod body 820 presses against the periphery of the third perforation 420 of the magnetic conductive sheets 410 farthest from the movable member 53 among the plurality of magnetic conductive sheets 410. One end of the rod body 820 facing the movable contact piece 54 is fixedly connected with the magnetic conductive sheet 410 which is closest to the movable member 53 among the plurality of magnetic conductive sheets 410 of the first magnetizer 40, for example, by riveting.

At the first position P1, among the plurality of the magnetic conductive sheets 410 in the first magnetizer 40, the magnetic conductive sheet 410 farthest from the movable member 53 presses against the surface of the first side 621 of the fixing part 620.

Figure 16:
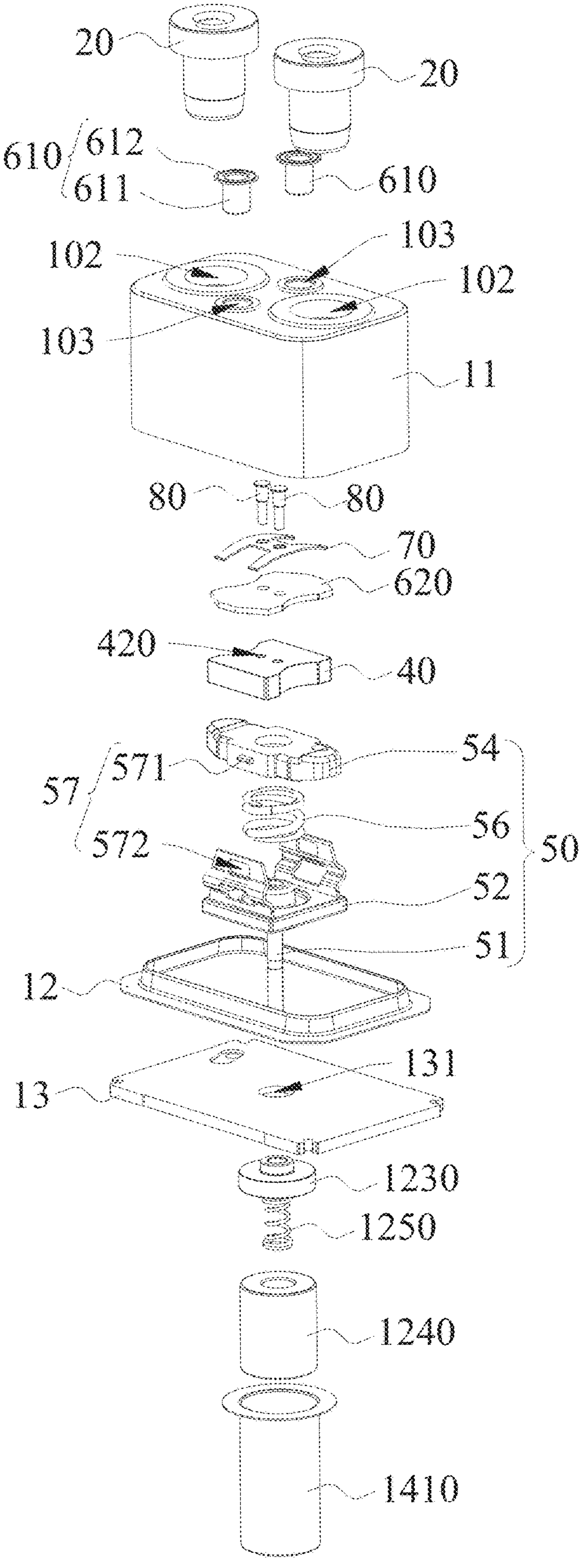
FIG. 16 is a schematic exploded view of the relay according to the third embodiment of the present disclosure, in which a housing, an electromagnet unit and an arc extinguishing unit are omitted.

As shown in FIG. 16, the relay according to the third embodiment has substantially the same structure as the relay according to the first embodiment. Therefore, in the following description of the relay of the third embodiment, the structure already described in the first embodiment will not be repeated. In addition, the same reference numbers are used to indicate the same structures as described in the first embodiment. Therefore, in the following description of this embodiment, the differences from the relay of the first embodiment are mainly described.

In this embodiment, the movable member 53 includes a movable contact piece 54, and does not include the second magnetizer 55. When both ends of the movable contact piece 54 are in contact with the pair of static contact leading-out terminals 20, current flows through movable contact piece 54, thereby forming a magnetic circuit around the movable contact piece 54 along the length direction of the movable contact piece 54. Due to the existence of the first magnetizer 40, most of the magnetic field of the magnetic circuit will gather on the first magnetizer 40 and magnetize it, so that a magnetic attraction force along the contact pressure direction will be generated between the first magnetizer 40 and the movable contact piece 54 with current flowing, which can resist the electro-dynamic repulsion force caused by short circuit current between the movable contact piece 54 and the static contact leading-out terminals 20, and ensure that the movable contact piece 54 and the static contact leading-out terminals 20 will not bounce off.

The first magnetizer 40 is movable relative to the movable contact piece 54 through the moving part 80, and then the distance between the first magnetizer 40 and the movable contact piece 54 is adjusted according to the value of the current flowing through movable contact piece 54, so as to take both the anti-short circuit ability and the limit breaking ability into account.

Figure 17:
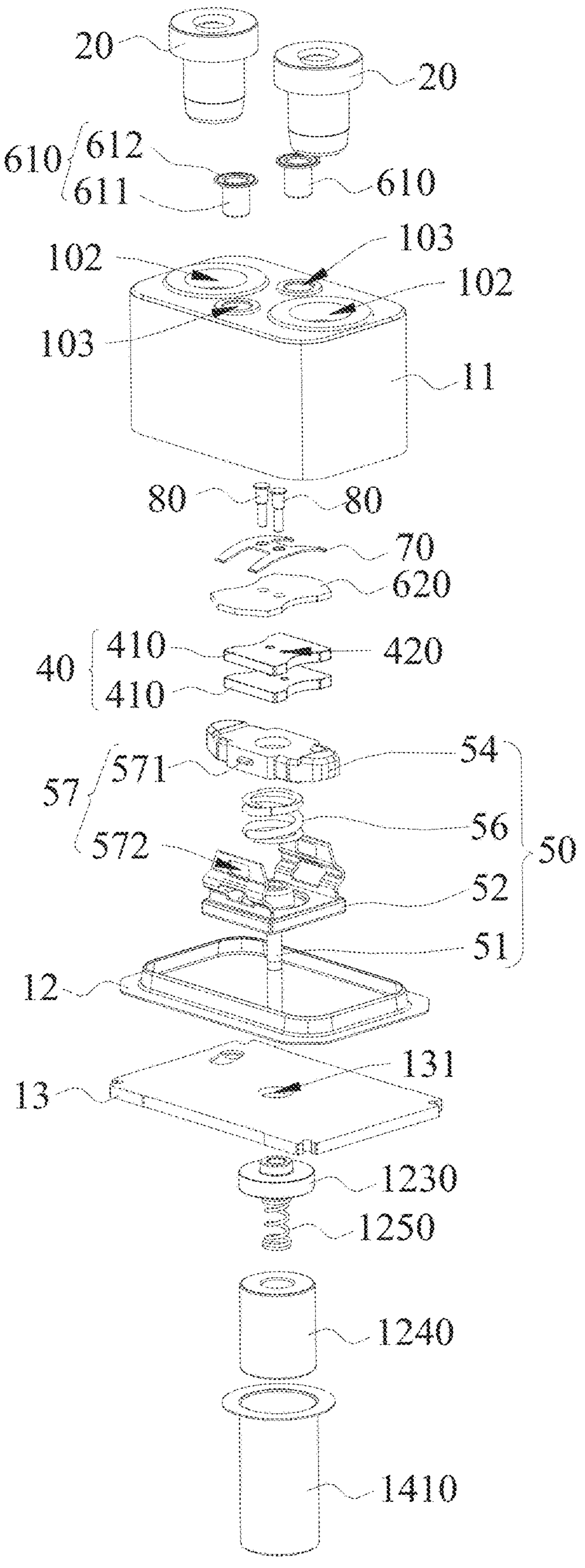
FIG. 17 is a schematic exploded view of the relay according to the fourth embodiment of the present disclosure, in which a housing, an electromagnet unit and an arc extinguishing unit are omitted.

As shown in FIG. 17, the relay according to the fourth embodiment has substantially the same structure as the relay according to the third embodiment. Therefore, in the following description of the relay of the fourth embodiment, the structure already described in the third embodiment will not be repeated. In addition, the same reference numbers are used to indicate the same structures as described in the first embodiment. Therefore, in the following description of this embodiment, the differences from the relay of the third embodiment are mainly described.

In this embodiment, the first magnetizer 40 may include a plurality of magnetic conductive sheets 410 stacked to one another.

It can be understood that the various examples/embodiments provided by the present disclosure can be combined with each other without any contradictions, and will not be exemplified herein.

In the embodiments of the present disclosure, the terms "first", "second", "third", "a pair of" and "a/an" are used only for the purpose of illustration, but not to be construed as indicating or implying relative importance. The term "a plurality of" refers to two or more, unless specifically defined otherwise. the terms “connect”, “fixedly connect”, ‘install” and “assemble” shall be broadly understood, unless otherwise explicitly specified and defined, for example, may be fixed connection, detachable connection or integral connection; the terms “installation”, “connection” and “fixed connection” may be direct connection, indirect connection through an intermediate media, or internal communication between two elements. For those ordinary skills in the art, the specific meanings of the above terms in the embodiments of the present disclosure can be understood depending on specific context.

In the description of the embodiment of the present disclosure, it should be understood that the orientation or position relationship indicated by the terms “upper”, “lower”, “left”, “right”, “front” and “rear” is based on the orientation or position relationship shown in the attached drawings, and is only for the convenience of describing the embodiments of the present disclosure and simplifying the description, rather than indicating or implying that the device or unit must have a specific direction and is constructed and operated in a specific orientation. Therefore, these terms are not to be construed as limiting the scope of the present disclosure.

In the description of this specification, the terms “one embodiment”, “some embodiments” and “specific embodiments” mean that specific features, structures, materials or characteristics described in connection with this embodiment or example are included in at least one embodiment of the embodiments or example of the present disclosure. In this specification, the schematic expressions of the above terms do not necessarily refer to the same embodiment or example. Moreover, the specific features, structures, materials or characteristics described may be combined in any one or more embodiments or examples in a suitable manner.

The above is only the preferred embodiments of the embodiments of the present disclosure and is not intended to limit the embodiments of the present disclosure. For the person skilled in the art, various modifications and variations can be made to the embodiments of the present disclosure. Any modifications, equivalent substitutions, improvements, etc. made within the spirit and principles of the embodiments of the present disclosure should be included within the protection scope of the embodiments of the present disclosure.

What is claimed is:

1. A relay, comprising:

an insulating cover having a contact chamber and a pair of first through holes in communication with the contact chamber;

a pair of static contact leading-out terminals passing through the pair of first through holes, respectively;

a fixing member comprising a fixing part and a connector, the connector has a tubular structure, one end of the connector in an axial direction is fixedly connected with the insulating cover, and the other end of the connector in the axial direction is connected with the fixing part;

a moving part arranged within the contact chamber and movably connected to the fixing part;

a first magnetizer arranged within the contact chamber and connected with the moving part; and a movable member movably arranged within the contact chamber and comprising a movable contact piece, the movable contact piece configured to come into contacted with or separated from the pair of static contact leading-out terminals; the first magnetizer being arranged at one side of the movable contact piece facing the static contact leading-out terminals;

wherein the first magnetizer is movable relative to the movable member through the moving part and is configured to adjust a distance between the first magnetizer and the movable member according to a value of a current flowing through the movable contact piece.

2. The relay according to claim 1, wherein the distance between the first magnetizer and the movable member is a maximum distance between the first magnetizer and the movable member.

3. The relay according to claim 1, wherein the first magnetizer moves between a first position and a second position through the moving part;

at the first position, the distance between the first magnetizer and the movable member is a first distance, and at the second position, the distance between the first magnetizer and the movable member is a second distance, and the first distance is greater than the second distance.

4. The relay according to claim 3, wherein at the second position, the second distance between the first magnetizer and the movable member is equal to zero.

5. The relay according to claim 3, wherein the first magnetizer is located at the first position, and the value of the current flowing through the movable contact piece is less than or equal to a threshold current;

when the value of the current flowing through the movable contact piece is greater than the threshold current, the first magnetizer moves from the first position to the second position.

6. The relay according to claim 1, wherein the relay further comprises:

a first elastic part for providing an elastic force to the moving part, so that the first magnetizer has a trend to move away from the movable member.

7. The relay according to claim 6, wherein the fixing part has a first side facing the movable member and a second side opposite to the first side;

the first elastic part is arranged at the second side, the first magnetizer and the movable member are both arranged at the first side, and the first magnetizer is arranged between the first elastic part and the movable member;

the moving part has one end connected with the first elastic part, and the other end connected with the first magnetizer.

8. The relay according to claim 7, wherein the fixing part has a first perforation which penetrates a surface of the first side and a surface of the second side;

the moving part is rod-shaped and movably passes through the first perforation.

9. The relay according to claim 8, wherein the first elastic part has a second perforation aligning with the first perforation;

the moving part passes through the first perforation and the second perforation.

10. The relay according to claim 9, wherein the moving part comprises a rod body and a pressing cap arranged at an end of the rod body, and the pressing cap presses against a periphery of the second perforation facing away from a side of the first magnetizer.

11. The relay according to claim 10, wherein the first magnetizer is provided with a third perforation aligning with the first perforation and the second perforation, and the rod body passes through the second perforation, the first perforation and the third perforation in sequence;

a step structure is arranged at an outer periphery of the rod body, an end of the rod body facing the movable member is fixedly connected with the first magnetizer, and the step structure presses against a periphery of the third perforation facing a side of the first elastic part.

12. The relay according to claim 7, wherein the first magnetizer moves between a first position and a second position through the moving part; at the first position, a distance between the first magnetizer and the movable member is a first distance, and at the second position, a distance between the first magnetizer and the movable member is a second distance, and the first distance is greater than the second distance;

at the first position, the first magnetizer presses against the surface of the first side, and an end of the moving part presses against the first elastic part, so that the first elastic part has elastic pre-pressure.

13. The relay according to claim 6, wherein the first magnetizer, the fixing part and the first elastic part are arranged between the pair of the static contact leading-out terminals.

14. The relay according to claim 6, wherein the first elastic part comprises a reed or a spring.

15. The relay according to claim 1, wherein a moving direction of the first magnetizer relative to the movable member is a direction in which the movable contact piece is in contact with or separated from the static contact leading-out terminals.

16. The relay according to claim 1, wherein the moving part is movably arranged at a side of the movable member facing the static contact leading-out terminals, and the moving part is located between the pair of the static contact leading-out terminals.

17. The relay according to claim 1, wherein the moving part is made of a metal material.

18. The relay according to claim 1, wherein the insulating cover comprises a ceramic cover, the pair of first through holes are formed on the ceramic cover; one end of the connector in the axial direction is fixedly connected with the ceramic cover.

19. The relay according to claim 18, wherein the ceramic cover is provided with a third through hole, the connector passes through the third through hole, one end of the connector in the axial direction is connected to a periphery of the third through hole of the ceramic cover.

20. The relay according to claim 19, wherein the connector comprises:

an inserting part, the inserting part has a tubular structure, the inserting part is inserted into the third through hole, and one end of the inserting part is connected to the fixing part;

a flange protruding from one peripheral surface of the inserting part far away from the fixing part, the flange is connected with a periphery of the third through hole of the ceramic cover.

21. The relay according to claim 20, wherein a base of the tubular structure is connected to the fixing part, the flange extends radially from an opening edge of the tubular structure to an outside of the tubular structure.

22. The relay according to claim 1, wherein the movable member further comprising:

a second magnetizer, the second magnetizer being fixedly connected to one side of the movable contact piece facing away from the first magnetizer, and the second magnetizer is configured to form a magnetic circuit together with the first magnetizer.

* * * * *